US012781783B2

(12) United States Patent
Dufaux et al.

(10) Patent No.: US 12,781,783 B2
(45) Date of Patent: Nov. 3, 2026

(54) CONNECTOR ASSEMBLY

(71) Applicant: THREE SMITH GROUP LIMITED, Elland (GB)

(72) Inventors: Christopher Paul Daniel Dufaux, Elland (GB); Dale Schofield, Elland (GB)

(73) Assignee: THREE SMITH GROUP LIMITED, Elland (GB)

( * ) Notice: Subject to any disclaimer, the term of this patent is extended or adjusted under 35 U.S.C. 154(b) by 171 days.

(21) Appl. No.: 18/290,725

(22) PCT Filed: Dec. 22, 2022

(86) PCT No.: PCT/GB2022/053364
§ 371 (c)(1),
(2) Date: Jan. 19, 2024

(87) PCT Pub. No.: WO2023/118883
PCT Pub. Date: Jun. 29, 2023

(65) Prior Publication Data

US 2026/0117808 A1 Apr. 30, 2026

(30) Foreign Application Priority Data

Dec. 23, 2021 (GB) ..................................... 2118984

(51) Int. Cl.
*F16B 7/02* (2006.01)
*F16B 7/04* (2006.01)

(52) U.S. Cl.
CPC ............ *F16B 7/025* (2013.01); *F16B 7/0413* (2013.01); *Y10T 403/7052* (2015.01)

(58) Field of Classification Search
CPC ....... F16L 9/06; F16L 37/092; F16L 37/0927; F16L 37/122; F16L 37/123; F16L 37/15;
(Continued)

(56) References Cited

U.S. PATENT DOCUMENTS 2,494,878 A * 1/1950 Jensen ................. A63C 11/221
403/109.5
4,238,164 A * 12/1980 Mazzolla .................. F16B 7/14
403/109.5
(Continued)

FOREIGN PATENT DOCUMENTS

CN 201326619 Y 10/2009
CN 107131187 A 9/2017
(Continued)

OTHER PUBLICATIONS

Translation of an Office Action cited in Japanese patent application No. 2024-503914; Dec. 25, 2024; 6 pp.
(Continued)

*Primary Examiner* — Amber R Anderson
*Assistant Examiner* — Kevin J Baynes
(74) *Attorney, Agent, or Firm* — Lempia Summerfield Katz LLC

(57) ABSTRACT

A connector assembly for engagement with a first member The connector assembly comprises a core element and an engagement sleeve. The first member defines a cavity with a contact surface, and an opening to the cavity, which the engagement sleeve is configured to fit within. The engagement sleeve has an opening and passage configured to receive at least part of the core element. The core element and engagement sleeve are configured such that when the connector assembly is in a first configuration, the engagement sleeve is slideable relative to the cavity contact surface of the first structural member. The core element and engagement sleeve are also configured such that when, the connector assembly is in a second configuration, the engagement sleeve is locked relative to the first structural member.

13 Claims, 19 Drawing Sheets

(58) Field of Classification Search

CPC .......... F16B 7/02; F16B 7/025; F16B 7/0413; F16B 7/1409; F16B 7/1463; Y10T 403/7052; Y10T 403/7054; Y10T 403/7056; Y10T 403/7058; Y10T 403/7064; Y10T 403/7067; Y10T 403/7069; Y10T 403/76

See application file for complete search history.

(56) References Cited

U.S. PATENT DOCUMENTS

| | | | | |
|---|---|---|---|---|
| 4,921,370 | A | 5/1990 | Handler et al. | |
| 5,240,289 | A | 8/1993 | Goettling | |
| 5,390,969 | A | 2/1995 | Guest | |
| 5,644,439 | A * | 7/1997 | Shiba | B62K 19/24 359/527 |
| 5,769,104 | A * | 6/1998 | Uemura | F16B 7/1427 135/69 |
| 5,876,147 | A * | 3/1999 | Longo | F16B 7/182 403/109.5 |
| 6,168,213 | B1 * | 1/2001 | Muller | E21B 43/116 285/391 |
| 6,302,614 | B1 * | 10/2001 | Tseng | F16B 7/1463 403/109.5 |
| 6,481,942 | B2 | 11/2002 | Tanaka | |
| 6,626,605 | B1 * | 9/2003 | Dean | F16B 7/0413 403/379.6 |
| 6,719,331 | B1 * | 4/2004 | Chen | F16B 7/1463 285/391 |
| 2002/0001513 | A1 | 1/2002 | Tanaka | |
| 2004/0096271 | A1 | 5/2004 | Peter | |
| 2004/0104319 | A1 | 6/2004 | Dean et al. | |
| 2008/0238096 | A1 | 10/2008 | Kees | |
| 2012/0152872 | A1 | 6/2012 | Didehvar | |
| 2020/0063903 | A1 | 2/2020 | Chernov | |
| 2021/0156499 | A1 | 5/2021 | Leger | |

FOREIGN PATENT DOCUMENTS

| | | | | |
|---|---|---|---|---|
| CN | 107830028 | A | 3/2018 | |
| DE | 2050264 | A1 | 4/1971 | |
| DE | 3211054 | A1 | 9/1983 | |
| DE | 4002057 | A1 | 2/1991 | |
| DE | 9410897 | U1 * | 10/1994 | F16B 7/025 |
| EP | 0003746 | A1 | 9/1979 | |
| EP | 0392148 | B1 | 10/1992 | |
| FR | 2109046 | A5 | 5/1972 | |
| FR | 2565300 | A1 * | 12/1985 | F16B 7/025 |
| GB | 2178810 | A | 2/1987 | |
| GB | 2245671 | A | 1/1992 | |
| GB | 2256246 | A | 12/1992 | |
| JP | 3033208 | U | 1/1997 | |
| JP | H09242724 | A | 9/1997 | |
| JP | 2001336515 | A | 12/2001 | |
| JP | 2011117498 | A | 6/2011 | |
| JP | 2020112238 | A | 7/2020 | |
| WO | 9300516 | A1 | 1/1993 | |
| WO | WO-2005049129 | A1 * | 6/2005 | F16L 37/0927 |

OTHER PUBLICATIONS

Translation of a Search and Exam Report cited in Chilean patent application No. CL202400163; Nov. 11, 2024; 17 pp.

International Preliminary Report on Patentability cited in corresponding international patent application No. PCT/GB2022/053364; Nov. 16, 2023; 6 pp.

International Search Report and Written Opinion cited in corresponding international application No. PCT/GB2022/053364; Apr. 4, 2023; 10 pp.

Search Report cited in corresponding British patent application No. GB2118984.0; Jun. 20, 2022; 4 pp.

Office Action cited in the Canadian patent application No. 3,226,748; Nov. 26, 2025; 8 pp.

* cited by examiner

CONNECTOR ASSEMBLY

RELATED APPLICATION DATA

This application is a U.S. national stage of and claims the benefit of and priority to prior filed international application no. PCT/GB2022/053364, filed Dec. 22, 2022, and which claims priority to Great Britain national application no. GB 2118984.0, filed Dec. 23, 2021. The entire contents of these prior filed applications are hereby incorporated by reference herein.

TECHNICAL FIELD

The present disclosure relates to a connector assembly.

BACKGROUND

It is a common requirement to connect structural members and/or components together to form a rigid and/or robust structure.

A traditional method of connecting posts and rails is by welding, which provides a secure and rigid connection. However, assembly or disassembly of a structure that is welded is time consuming and requires skilled labour and specialist equipment. Following disassembly, individual components of the structure are not easily reusable as they need to be prepared (e.g. machined), resulting in a loss of material and involving a large investment of time.

It is known to use fittings or couplings that connect structural members together and allow the structure to be disassembled and reused. A person assembling or disassembling the structure must handle parts of the coupling, its fixing members (e.g. a screw or bolt), as well as the structural members, and simultaneously hold and manipulate a tool to work the fixing member. This can be cumbersome, time consuming and frustrating, and can lead to an insecure connection of the structural members if they are not aligned properly during assembly. To reduce error and increase user safety, it is common for two people work together. Also the fixing members tend to get lost and/or damaged over time, making re-use of the connectors frustrating.

Hence a connector which is reusable, securely connects structural members, and allows a single user to quickly connect and disconnect structural members is highly desirable.

SUMMARY

According to the present disclosure there is provided an apparatus as set forth in the appended claims. Other features of the invention will be apparent from the dependent claims, and the description which follows.

Accordingly there may be provided a connector assembly (10, 12, 14) for engagement with a first member (100), wherein the first member (100) defines a cavity (102) with a contact surface (104), and an opening (106) to the cavity (102).

The connector assembly (10, 12, 14) may comprise a core element (300) having an outer engagement surface (302) extending from a leading edge end (310) towards a trailing edge end (312). The connector assembly (10, 12, 14) may comprise an engagement sleeve (400) extending from a leading edge end (410) to a trailing edge end (412), the engagement sleeve (400) defining a passage (402) having a central axis (450), wherein the engagement sleeve passage (402) has an opening (406) at the trailing edge end (412). The engagement sleeve opening (406) and engagement sleeve passage (402) may be configured to receive at least part of the core element (300) extending from the leading edge end (310) of the core element (300). The engagement sleeve (400) may comprise an engagement member (420) having an outer surface (422) and an inner surface (404). The outer surface (422) of the engagement member (420) may be configured for engagement with the contact surface (104) of the first member (100). The inner surface (404) of the engagement member (420) may have a first region (452) and a second region (454). The second region (454) may extend from a free end (440) defined by the leading edge end (410) to the end of the first region (452), and the first region (452) may extend towards the opening (406) of the engagement sleeve passage (402). The inner surface (404) of the engagement member (420) and the outer engagement surface (302) of the core element (300) may be configured to be slideable relative to each other in the first region (452) and the second region (454). The core element (300) and engagement sleeve (400) may be configured such that, with the engagement sleeve (400) entered in the cavity (102) of the first structural member the connector assembly (10, 12, 14) is operable to be in a first configuration in which the engagement sleeve (400) is slideable relative to the cavity (102) contact surface (104) of the first structural member when the leading edge end (310) of the core element (300) is located along the first region (452) of the engagement member (420). The connector assembly (10) may be operable to be in a second configuration in which the engagement sleeve (400) is locked relative to the first structural member (100) when the leading edge end (310) of the core element (300) is engaged with the second region (454) of the engagement member (420).

The core element (300) and engagement sleeve (400) may be configured such that when the leading edge end (310) of the core element (300) slides along at least part of the second region (454) of the inner surface (404) of the engagement member (420), the outer surface (422) of the engagement member (420) is urged to engage with the cavity contact surface (104) of the first member (100) until the connector assembly (10) is in the second configuration.

When the leading edge end (310) of the core element (300) is located along the first region (452) of the inner surface (404) of the engagement member (420), a clearance fit may be maintained between the inner surface (404) of the engagement sleeve (400) and the outer engagement surface (302) of the core element (300).

When the leading edge end (310) of the core element (300) is engaged with the second region (454) of the inner surface (404) of the engagement member (420), there may be an interference fit between the inner surface (404) of the engagement sleeve (400) and the outer engagement surface (302) of the core element (300).

The core element (300) and engagement sleeve (400) may be configured such that as the leading edge end (310) of the core element (300) moves from being engaged with the second region (454) of the engagement member (420) to being located along the first region (452) of the engagement member (420), the outer engagement surface (302) of the core element (300) disengages with the inner engagement surface (404) of the engagement sleeve (400) so as to permit the engagement sleeve engagement member (420) to disengage with the cavity contact surface (104) of the first member (100), and such that the connector assembly (10) transitions from the second configuration to the first configuration to thereby allow the engagement sleeve (400) to slide along the cavity contact surface (104) of the first structural member (100).

In the first configuration the free end (440) of the engagement member (420) may be a first distance (d1) from the central axis (450); and in the second configuration the free end (440) of the engagement member (420) is a second distance (d2) from the central axis (450), the second distance (d2) being greater than the first distance (d1).

In the first configuration the engagement member outer surface (422) may increase in diameter from the leading edge end (410) from a first diameter to a second diameter and then extends towards the trailing edge end (412) with a region (470) of constant diameter.

In the first configuration the engagement member inner surface (404) may increase in diameter from the leading edge end (410) along at least part of the engagement member inner surface (404) towards the trailing edge end (412).

The core element (300) outer engagement surface (302) may increase in diameter from the leading edge end (310) towards the trailing edge end (312) terminating in a region (370) of constant diameter.

The core element (300) may be provided with a first locking feature (330). The engagement sleeve (400) may be provided with a second locking feature (430). The first locking feature (330) and second locking feature (430) may be configured to engage with one another to lock the engagement sleeve (400) and core element (300) together. The first locking feature (330) and second locking feature (430) may be configured to disengage from one another so the engagement sleeve (400) and core element (300) are separable.

The first locking feature (330) and the second locking feature (430) may be positioned such that before the first locking feature (330) engages with the second locking feature (430), the leading edge end (310) of the core element (300) is in the first region (452) of the engagement sleeve (400) and the connector assembly (10, 12, 14) is in the first configuration. After the first locking feature (330) engages with the second locking feature (430), the leading edge end (310) of the core element (300) may be in the second region (454) of the engagement sleeve (400).

The engagement member outer surface (422) of the engagement sleeve (400) may be smooth or provided with at least one engagement tooth (424).

The core element (300) may substantially close the engagement sleeve passage (402).

The core element (300) may define an opening (306) at the trailing edge end (312) configured for receiving and engaging with a second member (200).

The engagement sleeve (400) may comprise additional engagement members (420). The plurality of engagement members (420) may be spaced apart around the central axis (450). Each engagement member (420) may have an outer surface (424) for engagement with the cavity (102) contact surface (104), an inner surface (404) for engagement with the core element (300) outer surface (302) and a free end (440) at the leading edge end (410), such that the free ends (440) are spaced apart from one another around the central axis (450) with a slot (408) therebetween.

The first locking feature (330) may be provided on an outer surface of the core element (300), between the section of the radially outer engagement surface (302) which engages with the radially inner surface (404) of the engagement member (420) and the trailing edge end (312) of the core element (300).

The second locking feature (430) may be provided on the inner surface of the engagement sleeve (400), between the radially inner engagement surface (404) of the engagement member (420) and the trailing edge end (412) of the engagement sleeve (400).

The first locking feature (330) on the core element (300) may be a first screw thread. The second locking feature (430) on the engagement sleeve (400) may be a second screw thread. Transition from the first configuration to the second configuration starts when the first locking feature (330) and second locking feature (430) engage.

The engagement sleeve engagement member (420) radially inner surface (404) may be smooth, and the core element (300) outer engagement surface (302) may be smooth, such that when the leading edge end (310) of the core element (300) is in the second region (454) of the engagement sleeve (400), the radially inner surface (404) of the engagement member (420) is in contact with the core element outer engagement surface (302).

The first locking feature (330) may be provided on the outer surface (302) of the core element (300), and may comprise a mount (340) which extends outwards from, and extends along, the outer engagement surface (302) from the core element (300) leading edge (310) towards the core element (300) trailing edge (312), and further comprises teeth (342) provided on a side of the mount to extend in a first circumferential direction.

The second locking feature (430) may be provided on a side of the engagement sleeve (400) engagement member (420) and comprises teeth (442) which extend in a second circumferential direction opposite to the first circumferential direction.

The teeth (342) of the first locking feature (330) and teeth (442) of the second locking feature (430) may be configured for interlocking engagement such that when the teeth (342) of the first locking feature (330) and teeth (442) of the second locking feature (430) are engaged, the core element (300) and engagement sleeve (400) are locked together.

The core element (300) and engagement sleeve (400) may be rotatable relative to one another around the central axis (450) to engage and disengage the first locking feature (330) and second locking feature (430).

There may also be provided a kit of parts for a structure comprising: a connector assembly (10, 12, 14) as according to the present disclosure, and a first member (100) which defines a cavity (102) with a contact surface (104), and an opening (106) to the cavity (102) to receive at least the leading edge end (410) of the engagement sleeve (400).

The cavity (102) contact surface (104) for engagement with the sleeve engagement member (420) may be of substantially constant cross-sectional area.

The diameter of the cavity contact surface (104) for engagement with the sleeve engagement member (420) may at most be the same as the outer diameter of the sleeve engagement member outer surface (422).

The kit of parts may further comprise a second member (200); the second member (200) extending from and/or coupled to the core element (300), such that the first member (100) is coupled to the second member (200).

The first member (100) and/or second member (200) may be a post or rail.

The first member (100) may be a post and the second member (200) may be an end cap or mount for an accessory.

The engagement sleeve (400) may provides fluid communication between the first member (100) cavity (102) to an external surface of the cap.

Hence there is provided a connector assembly and a kit of parts for a structure. The elements of the connector assembly 10, 12, 14 may be easily assembled and combined with a structural member and/or accessory by one user with no need for further parts (for example a screw) or the use of any bonding material.

BRIEF DESCRIPTION OF THE DRAWINGS

Examples of the present disclosure will now be described with reference to the accompanying drawings, in which.

DETAILED DESCRIPTION

Figure 1:
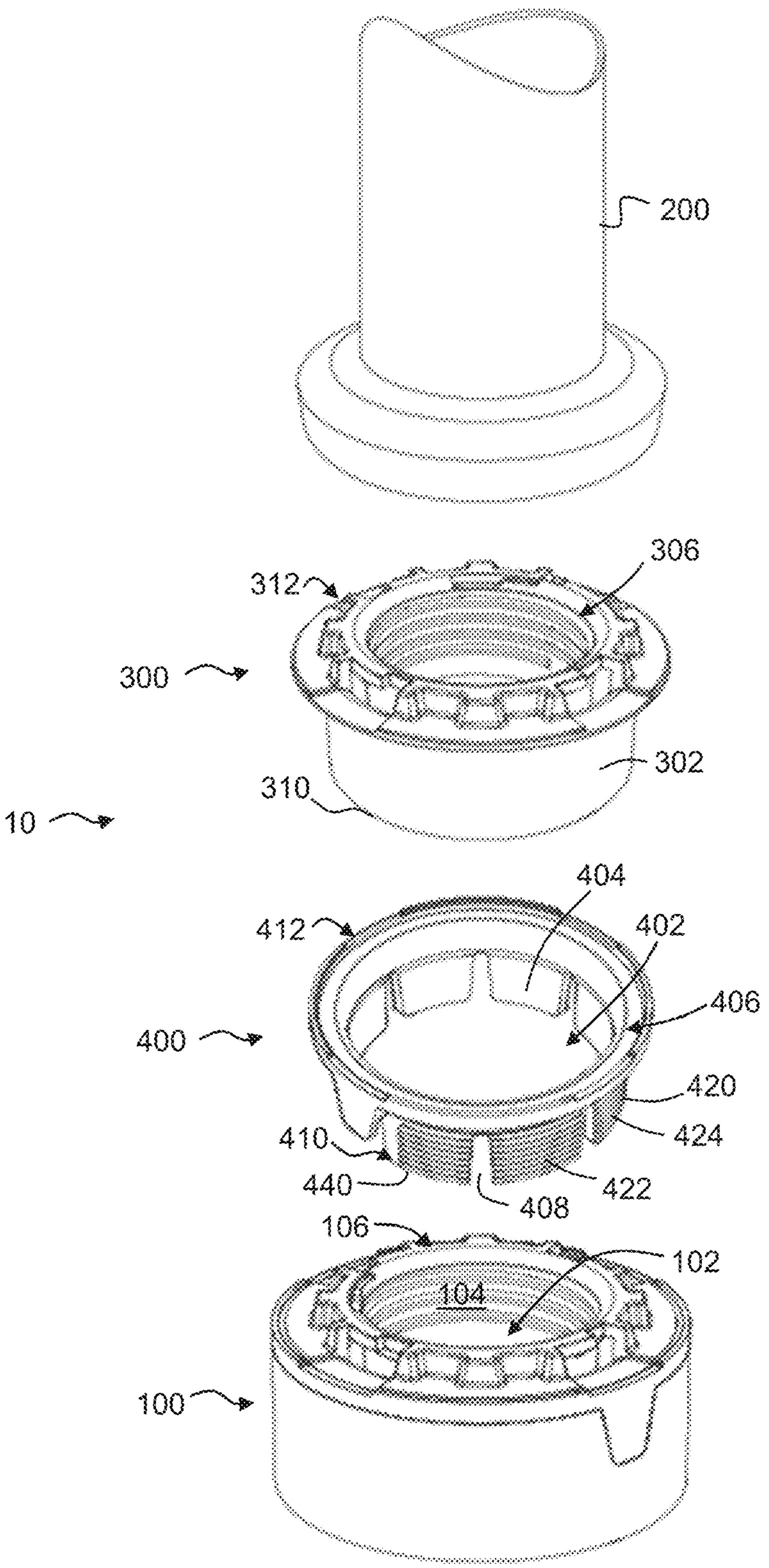
FIG. 1 shows an exploded perspective view of a first example of a connector assembly according to the present disclosure.
Figure 2:
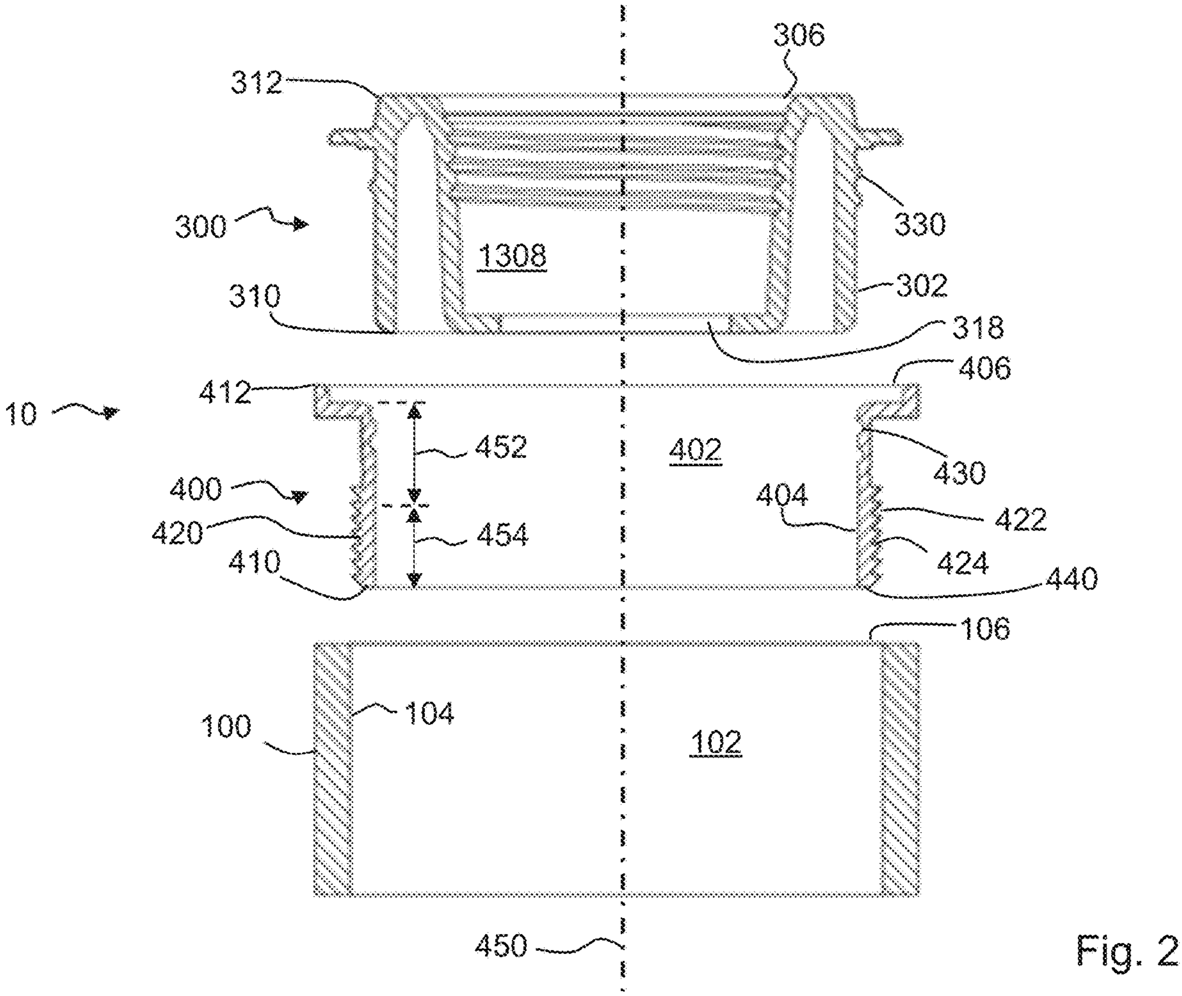
FIGS. 2 to 5 show stages of assembly of the connector assembly shown in FIG. 1.
Figure 3:
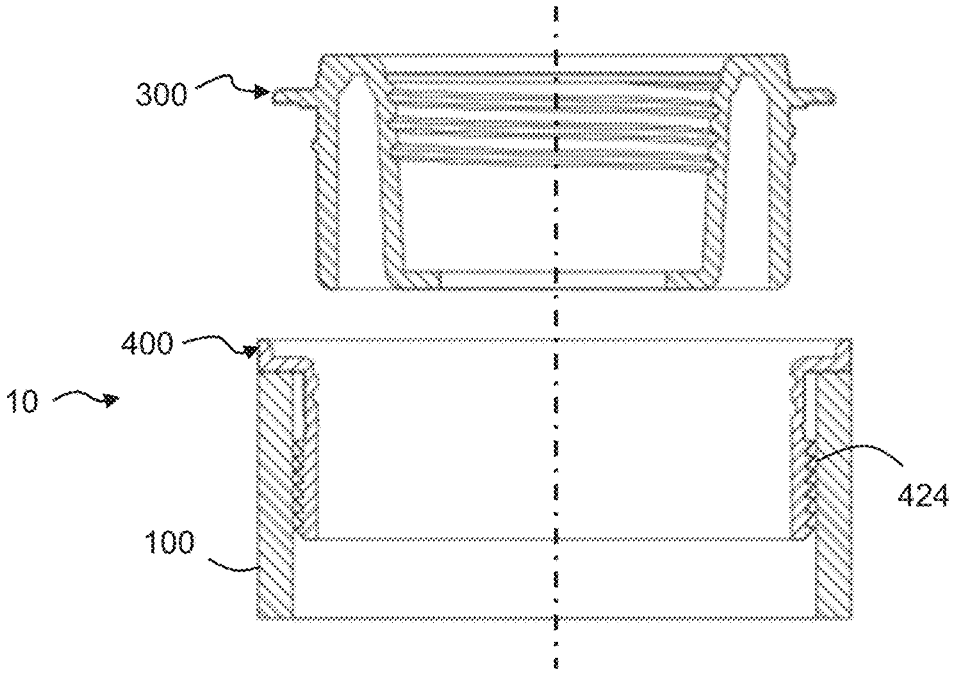
Figure 4:
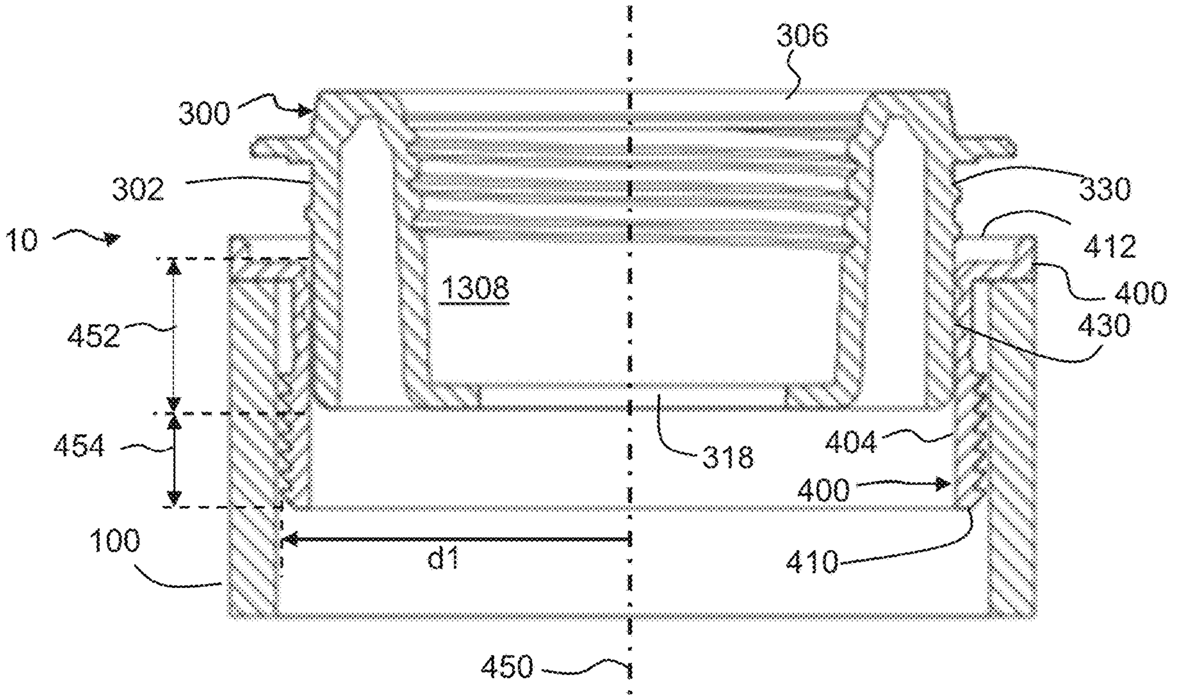

The present disclosure relates to a connector assembly 10, 12, 14, a kit of parts comprising a connector assembly 10, 12, 14 of the present disclosure and a method of assembly of an assembly incorporating the connector assembly 10, 12, 14 and/or a kit of parts of the present disclosure.

The present disclosure relates to a connector assembly 10, 12, 14 for engagement with a first member 100 (i.e. a structural member) which defines a cavity 102 with a contact surface 104, and an opening 106 to the cavity 102, for example a hollow pipe or tube, which may be provided as a post or rail. The connector assembly 10, 12, 14 may be configured to engage in the cavity defined by the wall of a tube. The connector assembly 10, 12, 14 may be configured to engage in an open end of a tubular and/or structural member 100 which defines an opening to a cavity defined by the wall of the tubular and/or structural member 100.

As shown in the figures, the structural member 100, and/or cavity 102 may be circular in cross-section. In other examples the structural member 100, and/or cavity 102 may be polygonal (for example square) in cross-section.

The connector assembly 10, 12, 14 comprises a core element 300 and an engagement sleeve 400. In the examples shown these are circular in cross-section. In other examples the core element 300 and engagement sleeve 400 may be polygonal (for example square) in cross-section.

FIGS. 1 to 7 illustrate a first example 10 of a connector assembly according to a present disclosure. FIGS. 8 to 13 illustrate a second example 12 of a connector assembly according to a present disclosure. FIGS. 14 to 20 illustrate a third example 14 of a connector assembly according to a present disclosure. Although features of the different examples 10, 12, 14 vary, they share common features. The features which are common are referenced by use of the same reference numerals.

In all of the examples of the present disclosure, the connector assembly 10, 12, 14 comprises a core element 300 having an outer engagement surface 302 (e.g. a radially outer engagement surface 302) extending from a leading edge end 310 (e.g. leading edge end region 310) towards a trailing edge end 312.

The connector assembly 10, 12, 14 also comprises an engagement sleeve 400 extending from a leading edge end 410 to a trailing edge end 412. The engagement sleeve 400 defines a passage 402 having a central axis 450. The engagement sleeve passage 402 has an opening 406 at the trailing edge end 412. The engagement sleeve passage 402 may have an opening at the leading edge end 410.

The engagement sleeve opening 406 and engagement sleeve passage 402 are configured to receive at least part of the core element 300 extending from the leading edge end 310 of the core element 300.

The engagement sleeve 400 comprises an engagement member 420 having an outer surface 422 (e.g. a radially outer surface 422) configured for engagement with the cavity contact surface 104 of the first structural member 100. The engagement member 420 also comprises an inner surface 404 (e.g. a radially inner surface 404) for engagement with the outer engagement surface 302 of the core element 300. The engagement member 420 extends to a free end 440 at the leading edge end 410. That is to say, the engagement member 420 terminates at a free end 440 at the leading edge end 410.

The engagement member 420 may be termed a "leg" or "finger" as it extends from a base part (e.g. ring) of the engagement sleeve 400 (which defines the trailing edge end 412) to a free end 410. The engagement member 420 may be resiliently flexible. The engagement member 420 may be resiliently deformable. The engagement member 420 is pivotable relative to the base part (e.g. ring) of the engagement sleeve 400. The engagement member 420 may be flexible (e.g. bendable) along its length.

In some examples, for example as shown in FIGS. 1 to 7, the outer surface 422 of the engagement member 420 of the engagement sleeve 400 is provided with at least one engagement tooth 424 and is configured to press into the cavity contact surface 104 of the first structural member 100.

In other examples, as shown in FIGS. 8 to 24, the outer surface 422 of the engagement member 420 of the engagement sleeve 400 is smooth, and is configured to press against, but not dig into, the cavity contact surface 104 of the first structural member 100.

In some examples, as shown in FIGS. 8 to 24, the core element 300 may be configured to substantially close (and in some examples seal) the engagement sleeve passage 402. In some examples, the core element 300 may be solid. The core element 300 may define an opening 318 at the leading edge end 310, a passage 308 extending some, but not all, of the way to the trailing edge end 312.

In other examples, as shown in FIGS. 1 to 8, the core element 300 defines an opening 306 at the trailing edge end

312 and an opening 318 at the leading edge end 310, a passage 1308 extending therebetween. The passage 1308 may be configured for receiving and engaging with a second member 200, for example a second structural member or accessory 200. For example the passage 1308 may be configured to mount the end of a post or to receive an adapter which in turn is fixed to another post.

Alternatively as shown in FIG. 1, the core element 300 may comprise further engagement features for co-operative engagement with engagement features on the second structural member or accessory 200. Thus the second structural member or accessory 200 may locate on and lock to the part of the core element 300 which extends from the sleeve 400.

Figure 23:
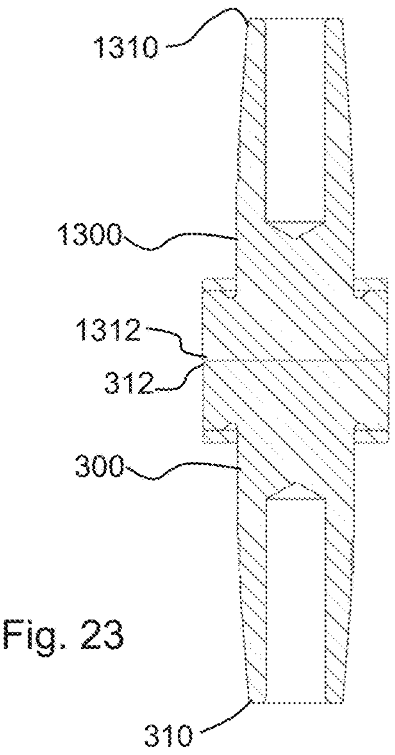
FIG. 23 shows a further example of the second example of the connector assembly.
Figure 24:
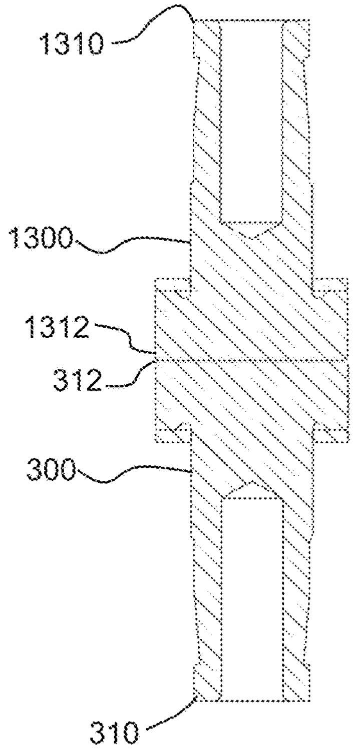
FIG. 24 shows a further example of the third example of the connector assembly.

In the second example of connector assembly 12 shown in FIGS. 8 to 13 and the third example connector assembly 14 shown in FIGS. 14 to 22, a second structural member or accessory 200 may be attached to the trailing edge end 312 of the core element 300. For example the second structural member or accessory 200 may be glued/bonded to the trailing edge end 312, or an engagement feature may be provided on the trailing edge end 312 for the second structural member or accessory 200 to be attached to. As shown in FIGS. 23, 24 the engagement feature may be provided as a second core element 1300, identical to the core element 300 as herein described, joined at their respective trailing edge ends 312, 1312 and extending to their respective leading edge ends 310, 1310. In such examples, the structural member or accessory 200 is attachable and fixable to the second core element 1300 in the same way as the first structural member 100 is attachable and fixable to the first core element 300.

The inner surface 404 of the engagement member 420 has a first region 452 which extends in a direction away from the opening 406 to a second region 454, and the second region 454 extends from the end of the first region 452 to a free end 440 defined by the leading edge end 410. That is to say, the second region 454 extends from the free end 440 defined by the leading edge end 410 of the engagement member 420 to where it meets the end of the first region 452, and the first region 452 extends at least part of the way towards the opening 406 of the engagement sleeve passage 402 (i.e. towards the trailing edge end 412).

The engagement sleeve 400 comprises additional engagement members (e.g. fingers/legs) 420 which may be of the same or similar configuration as hereinbefore described. The plurality of engagement members 420 may be spaced apart around central axis 450 with a slot 408 therebetween. Each engagement member 420 has an outer surface 424 (e.g. a radially outer surface) for engagement with the cavity 102 contact surface 104, an inner surface 404 (e.g. radially inner surface) for engagement with the core element 300 outer surface 302 and a free end 440 at the leading edge end 410. The free ends 440 may be spaced apart from one another around the central axis 450 with the slot 408 therebetween. The engagement members 420 may be free to move relative to one another. A clearance may be maintained between the free ends 440.

The inner surface 404 of the engagement sleeve 400 and outer engagement surface 302 of the core element 300 are configured such that core element 300 is moveable (i.e. translatable) relative to the first region 452 and the second region 454 of the inner surface 404 of the engagement sleeve 400. That is to say, the outer engagement surface 302 of the core element 300 is configured to move (i.e. translate) along the first region 452 and the second region 454 of the inner surface 404 of the engagement sleeve 400.

The inner surface 404 each engagement sleeve engagement member 420 may be smooth. The outer engagement surface 302 of the core element 300 may be smooth. The outer engagement surface 302 of the core element 300 is configured to slide along the first region 452 and the second region 454 of the inner surface 404 of the engagement sleeve 400. Hence because the inner surface 404 of each engagement sleeve engagement member 420 and outer engagement surface 302 of the core element 300 are smooth, the outer engagement surface 302 of the core element 300 may be entered into, and removed from, the engagement sleeve passage 402, and translate relative to the inner surface of the engagement sleeve 400, including the inner surface 404 of each engagement sleeve engagement member 420, without the material of one part digging (e.g. cutting) into the material of the other part.

The features of the core element 300 and engagement sleeve 400 may be sized relative to each other such that a clearance fit may be maintained between the inner surface 404 of the engagement member 420 and the outer engagement surface 302 of the core element 300 when the leading edge end 310 of the core element 300 is located along (e.g. adjacent) the first region 452 of the inner surface 404 of the engagement member 420.

Hence when the leading edge end 310 of the core element 300 is in the second region 454 of the engagement sleeve 400, the whole of the radially inner surface 404 of each engagement member 402 of the engagement sleeve 400 may be in contact with co-operating area of the core element outer engagement surface 302.

The features of the core element 300 and engagement sleeve 400 may be sized relative to each other such that there is an interference fit between the inner surface 404 of the engagement member 420, and the outer engagement surface 302 of the core element 300 when the leading edge end 310 of the core element 300 is engaged with the second region 454 of the inner surface 404 of the engagement member 420.

The core element 300 and engagement sleeve 400 may be configured such that, with the engagement sleeve 400 entered in the cavity 102 of the first structural member, when the connector assembly 10, 12, 14 is in a first configuration in which the engagement sleeve 400 is slideable relative to the cavity 102 contact surface 104 of the first structural member, the leading edge end 310 of the core element 300 is located along (e.g. adjacent) the first region 452 of the engagement member 420. The core element 300 and engagement sleeve 400 may also be configured such that when the connector assembly 10, 12, 14 is in a second configuration in which the engagement sleeve 400 is locked relative to the first structural member 100, the leading edge end 310 of the core element 300 is engaged with the second region 454 of the engagement member 420. That is to say, the engagement sleeve 400 is freely moveable (e.g. slideable) relative to the cavity 102 contact surface 104 of the first structural member until the leading edge end 310 of the core element 300 outer surface 302 is engaged with the second region 454 of the engagement member 420.

The core element 300 and engagement sleeve 400 are configured such that when the leading edge end 310 of the core element 300 moves (e.g. slides) from the first region 452 to along at least part of the second region 454 of the inner surface 404 of the engagement member 420, the outer surface 422 of the engagement member 420 is urged to engage with the cavity contact surface 104 of the first member 100 until the connector assembly 10, 12, 14 is in the second configuration.

The core element 300 and engagement sleeve 400 may be configured such when the core element 300 is moved in a first direction along the engagement sleeve passage 402 (e.g. parallel to the central axis 450), the outer engagement surface 302 of the core element 300 engages with the inner engagement surface 404 of the engagement member 420 to change the connector assembly 10, 12, 14 from the first configuration to the second configuration. The first direction is in the direction from the trailing edge end 412 to the leading edge end 410 of the engagement sleeve 400.

The core element 300 and engagement sleeve 400 may be further configured such when the core element 300 is moved in a second direction along the engagement sleeve passage 402 (e.g. parallel to the central axis 450), the outer engagement surface 302 of the core element 300 disengages with the inner engagement surface 404 of the engagement sleeve 400 member to change the connector assembly 10, 12, 14 from the second configuration to the first configuration to thereby allow the engagement sleeve 400 to slide along the cavity contact surface 104 of the first structural member 100. The second direction is in the direction from the leading edge end 410 to the trailing edge end 412 of the of the engagement sleeve 400.

That is to say, the core element 300 and engagement sleeve 400 are configured such that when the leading edge end 310 of the core element 300 enters (i.e. starts to move along) the second region 454 of the engagement member 420 in the first direction, the outer engagement surface 302 of the core element 300 is urged to engage with the inner engagement surface 404 of engagement member 420 such that outer surface 422 of the engagement sleeve engagement member 420 is urged to engage with the cavity contact surface 104 of the first member 100.

The core element 300 and engagement sleeve 400 are configured such that when the leading edge end 310 of the core element 300 moves from being located along (e.g. adjacent) the first region 452 of the inner surface 452, to being engaged with the second region 454 of the inner surface 404 of the engagement member 420, the outer engagement surface 302 of the core element 300 is urged to engage with the inner surface 404 of the engagement member 420 such that the outer surface 422 of the engagement member 420 is urged to engage with the cavity contact surface 104 of the first member 100 until the connector assembly 10, 12, 14 is in the second configuration.

The core element 300 and engagement sleeve 400 are configured such that as the leading edge end region 310 of the core element 300 moves from being engaged with the second region 454 of the engagement member 420 to being located along the first region 452 of the engagement member 420 (i.e. is moved in the second direction), the outer engagement surface 302 of the core element 300 disengages with the inner engagement surface 404 of the engagement sleeve 400 so as to permit the engagement sleeve engagement member 420 to disengage with the cavity contact surface 104 of the first member 100, and such that the connector assembly 10, 12, 14 transitions from the second configuration to the first configuration to thereby allow the engagement sleeve 400 to slide along the cavity contact surface 104 of the first structural member 100.

The core element 300 outer engagement surface 302 may increase in diameter from the leading edge end 310 towards the trailing edge end 312, terminating in a region 370 of constant diameter. That is to say, the core element 300 outer engagement surface 302 has a frustoconical region 360 extending from the leading edge end 310 to a region 370 of constant diameter, which extends towards the trailing edge end 312. The act of the core element 300 moving along the inside of the engagement sleeve 400, and in particular along the inside of the engagement member 420, causes the engagement member 420 to be forced away from the central axis 450.

As illustrated in FIGS. 4, 9, 10, 11, 16, 17, in the first configuration of the connector assembly 10, 12, 14 the engagement member outer surface 422 has a frustoconical region 460, which increases in diameter from the leading edge end 410 from a first diameter to a second diameter. A region 470 of constant diameter extends from the second diameter end of the frustoconical region 460 towards the trailing edge end 412. Hence the surface defined by the constant diameter region 470 extends substantially parallel to the central axis 450. The first diameter may have a value in the range of 0.90 to 0.98 of the second diameter.

As illustrated in FIGS. 4, 10, 11, 16, 17, in the first configuration of the connector assembly 10 the free end 440 of the engagement member 420 is a first distance d1 from the central axis 450. In the first configuration of the connector assembly 10, 12, 14 the distance between the engagement member outer surface 422 and the central axis 450 varies along the length of the engagement member outer surface 422.

Figure 5:
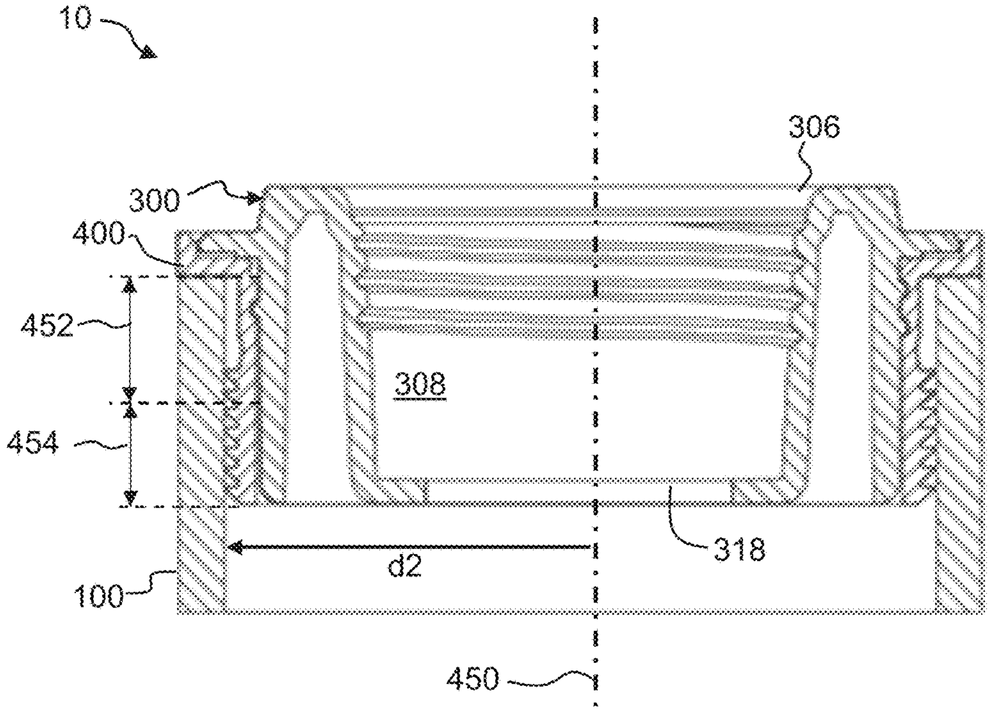
Figure 6:
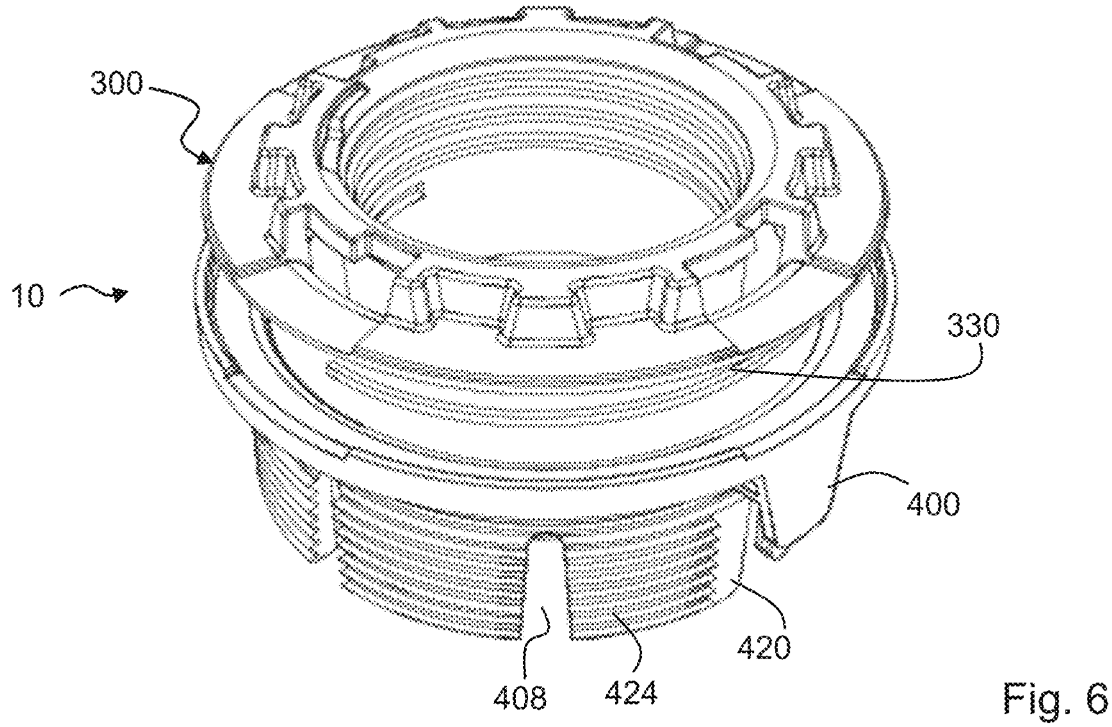
FIG. 6 shows a perspective view of a partial assembly of the components of the connector assembly shown in FIGS. 1 to 5.
Figure 7:
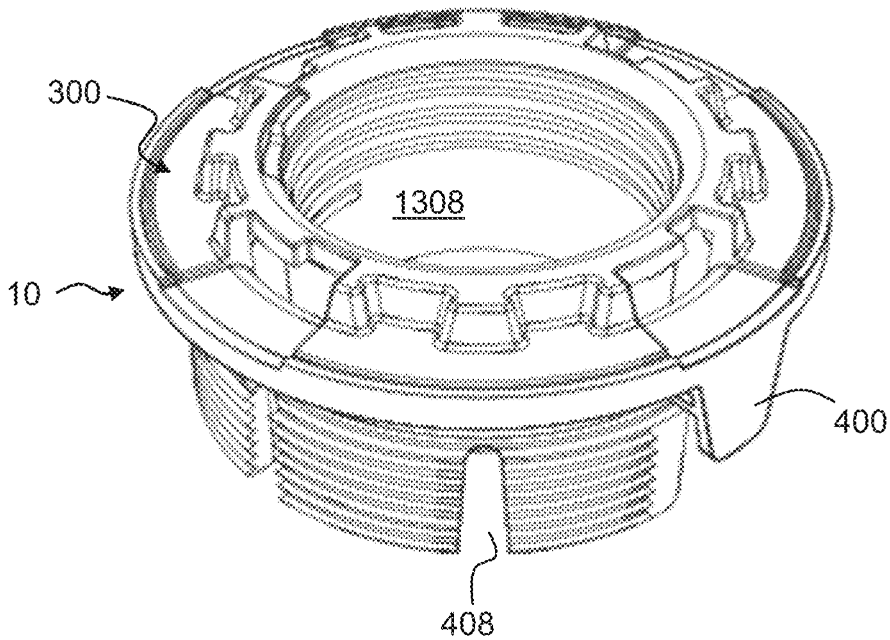
FIG. 7 shows a perspective view of completed assembly of the components of the connector assembly shown in FIGS. 1 to 6.
Figure 8:
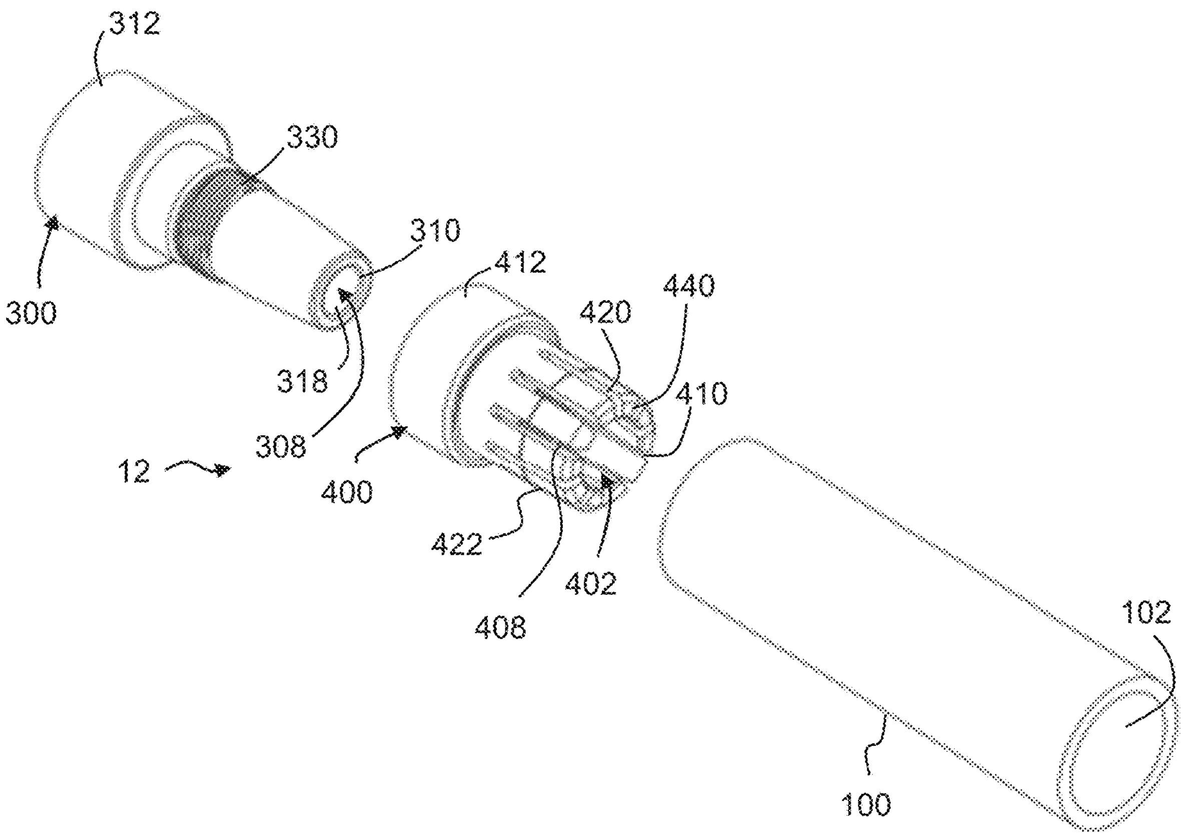
FIG. 8 shows an exploded view of a second example of a connector assembly according to the present disclosure.
Figure 13:
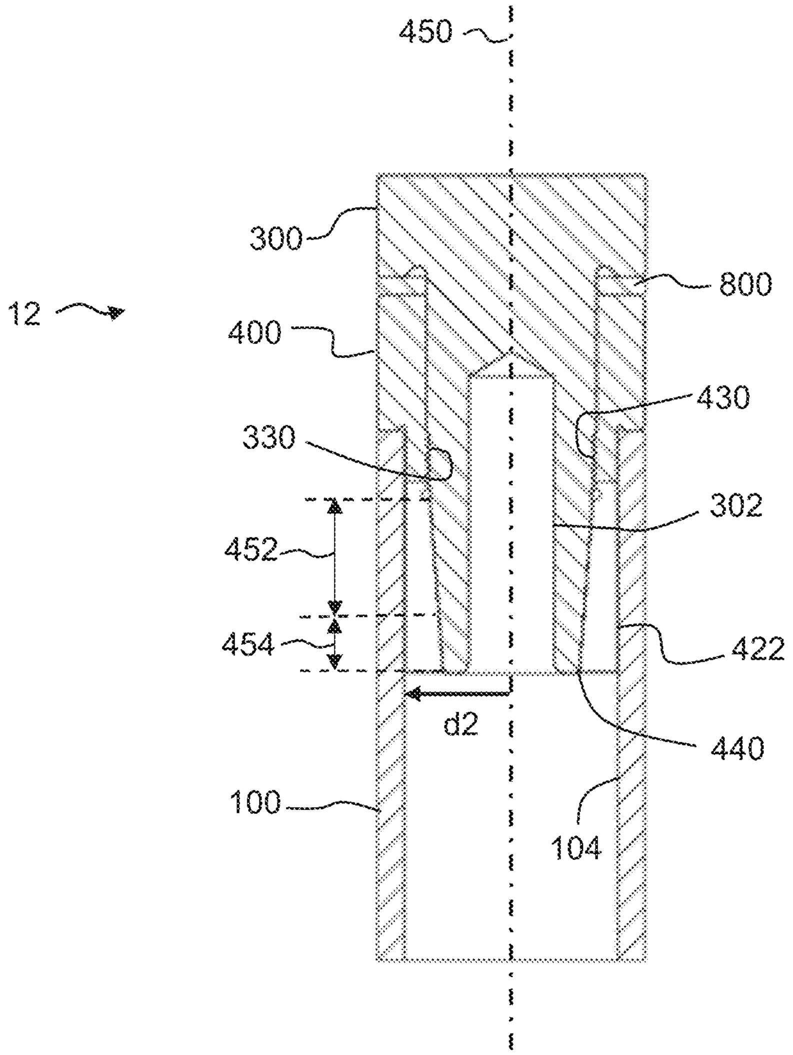
Figure 14:
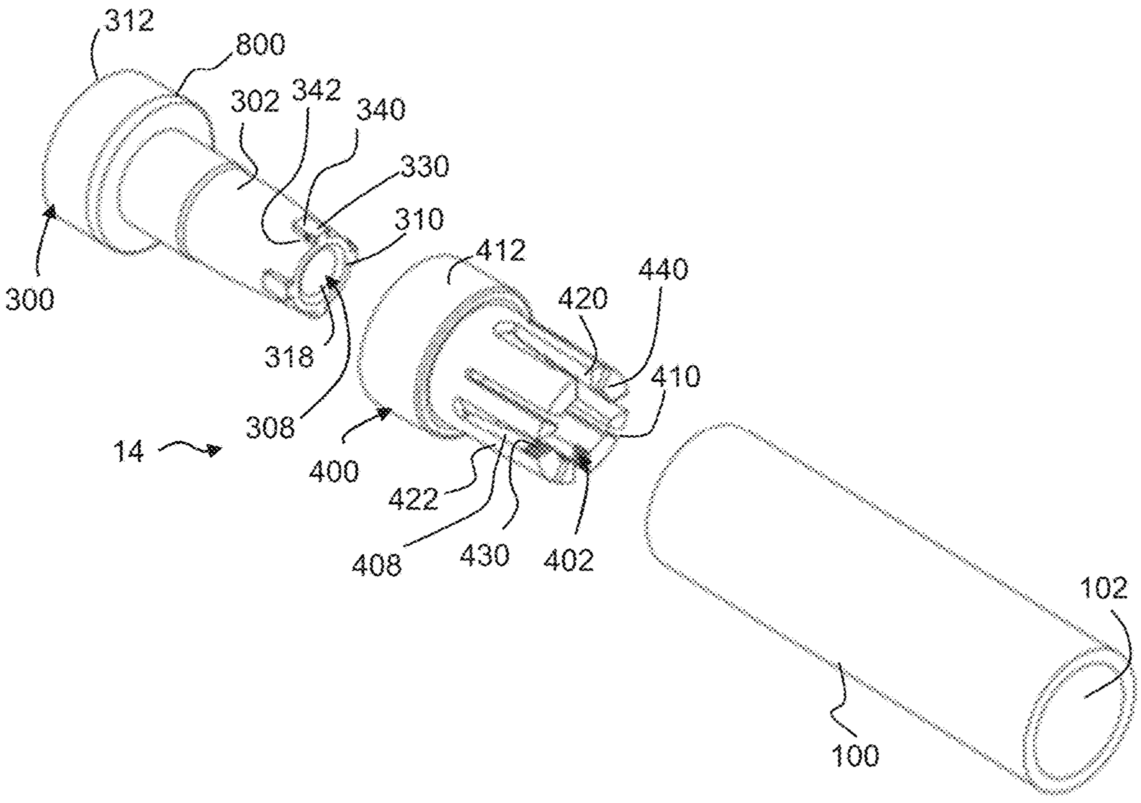
FIG. 14 shows an exploded view of a third example of a connector assembly according to the present disclosure.
Figure 15:
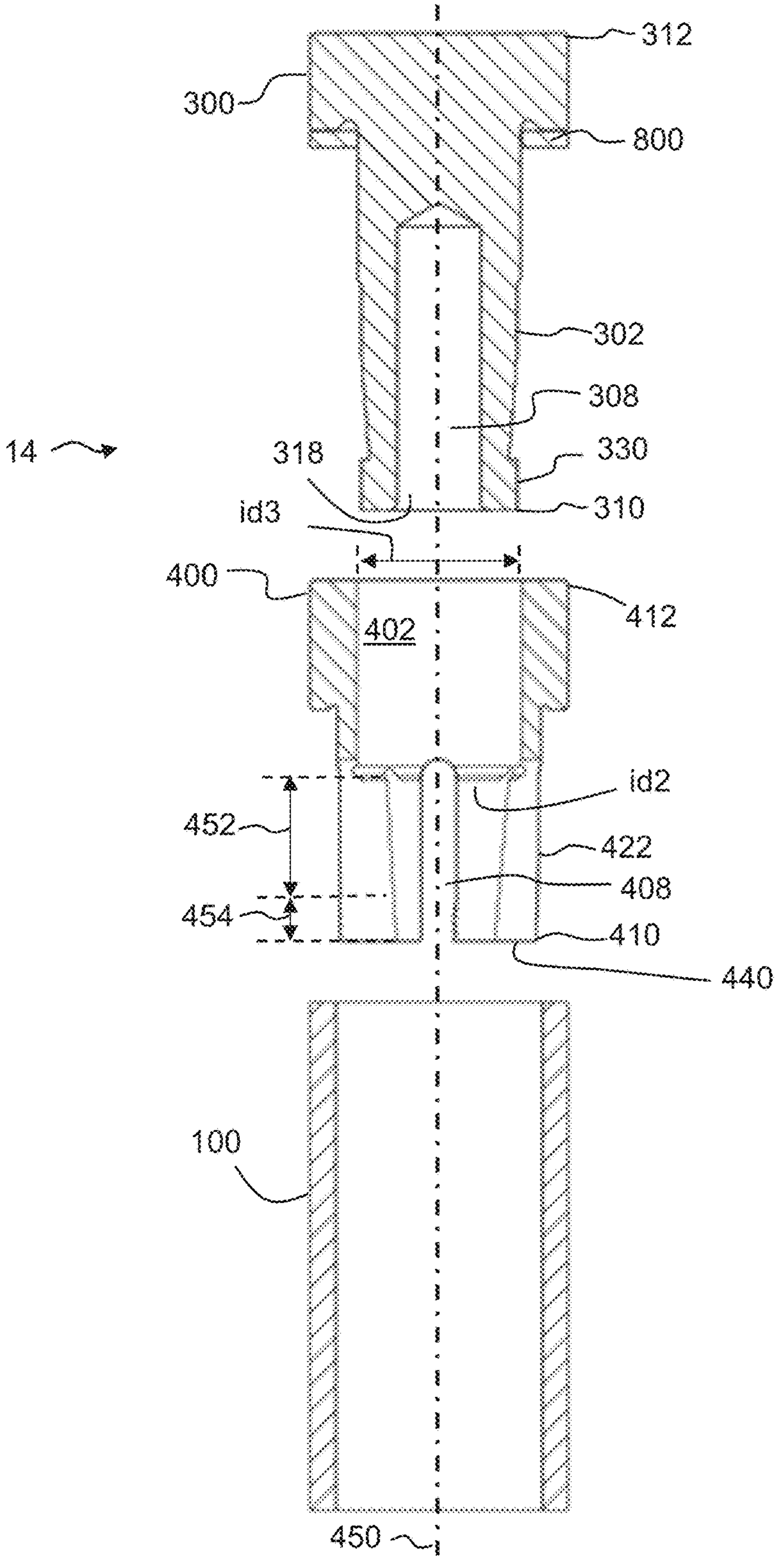
FIGS. 15 to 19 show the stages of assembly of the connector assembly shown in FIG. 14.
Figure 16:
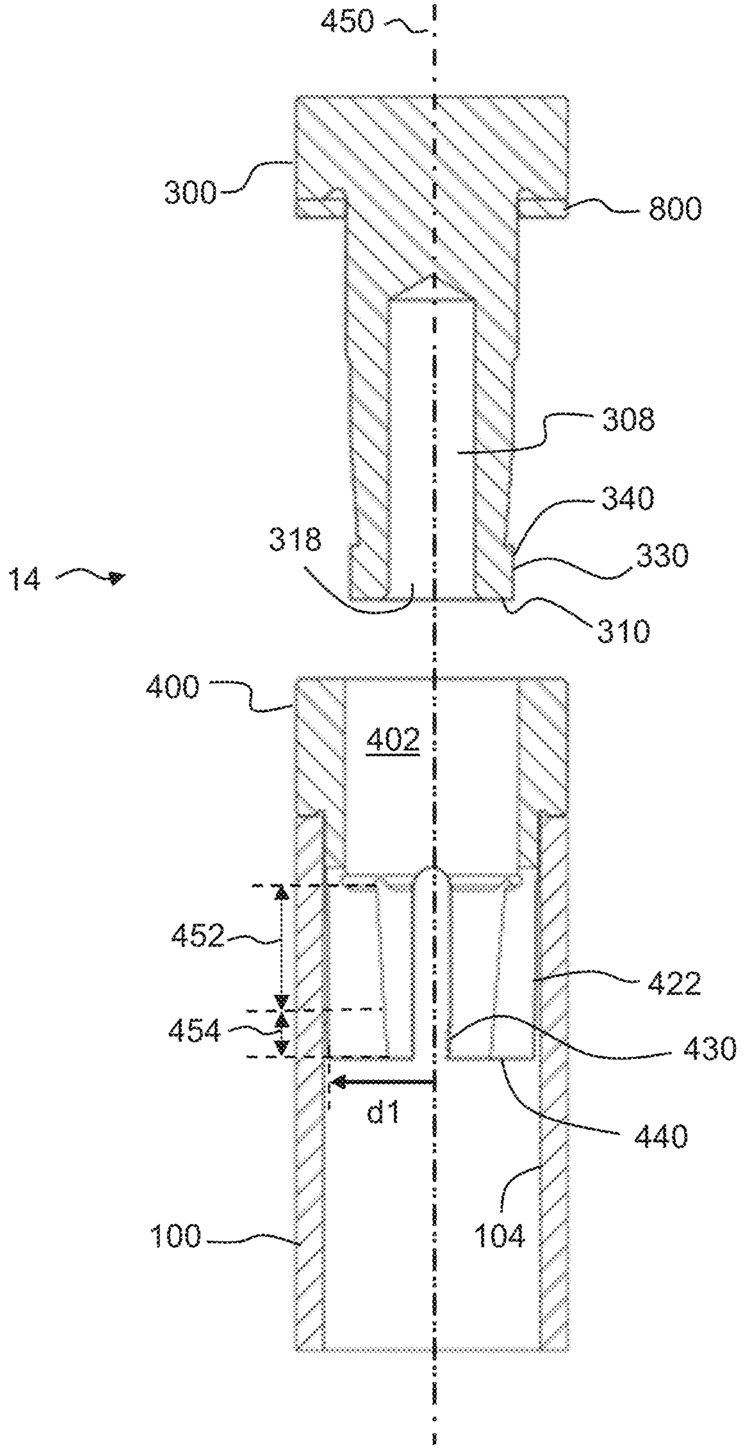
Figure 17:
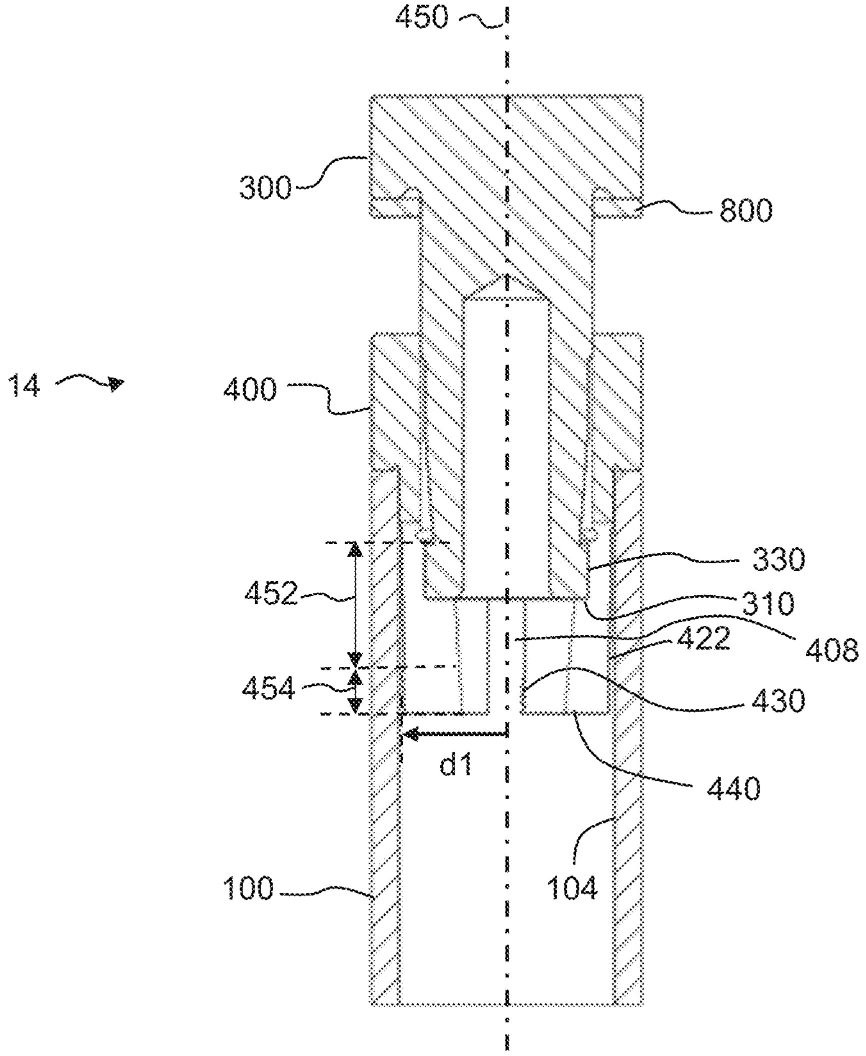
Figure 18:
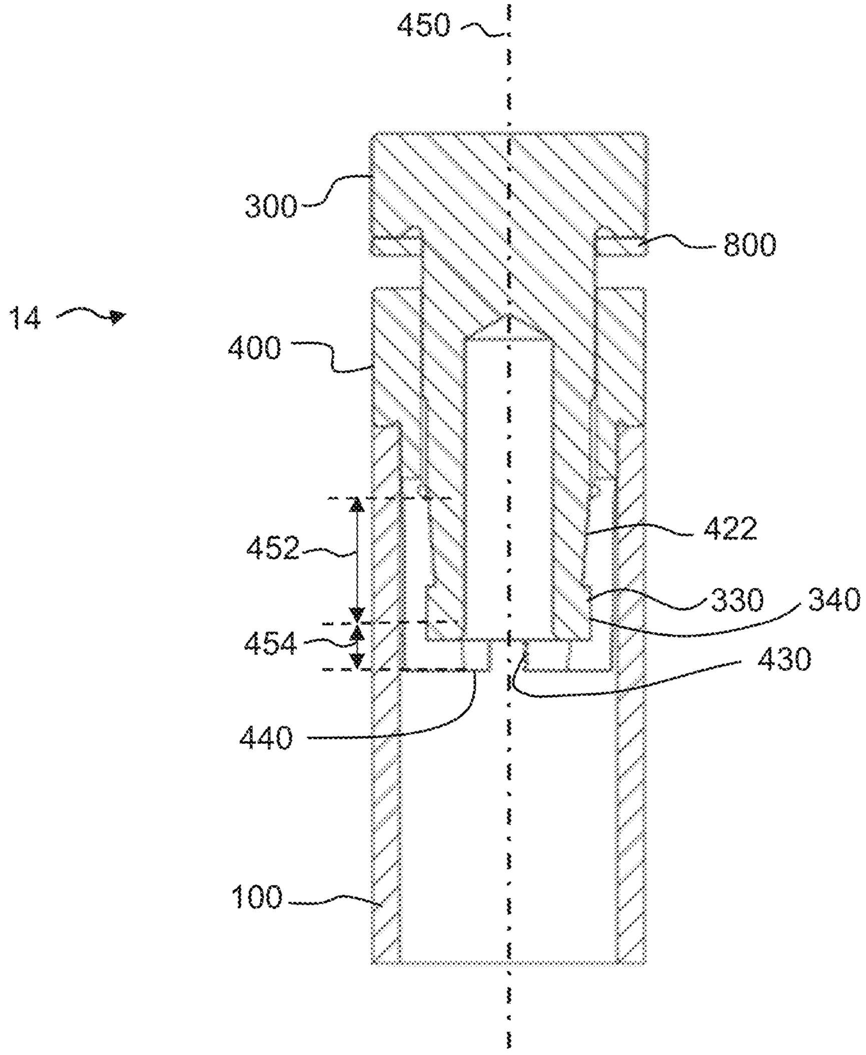
Figure 19:
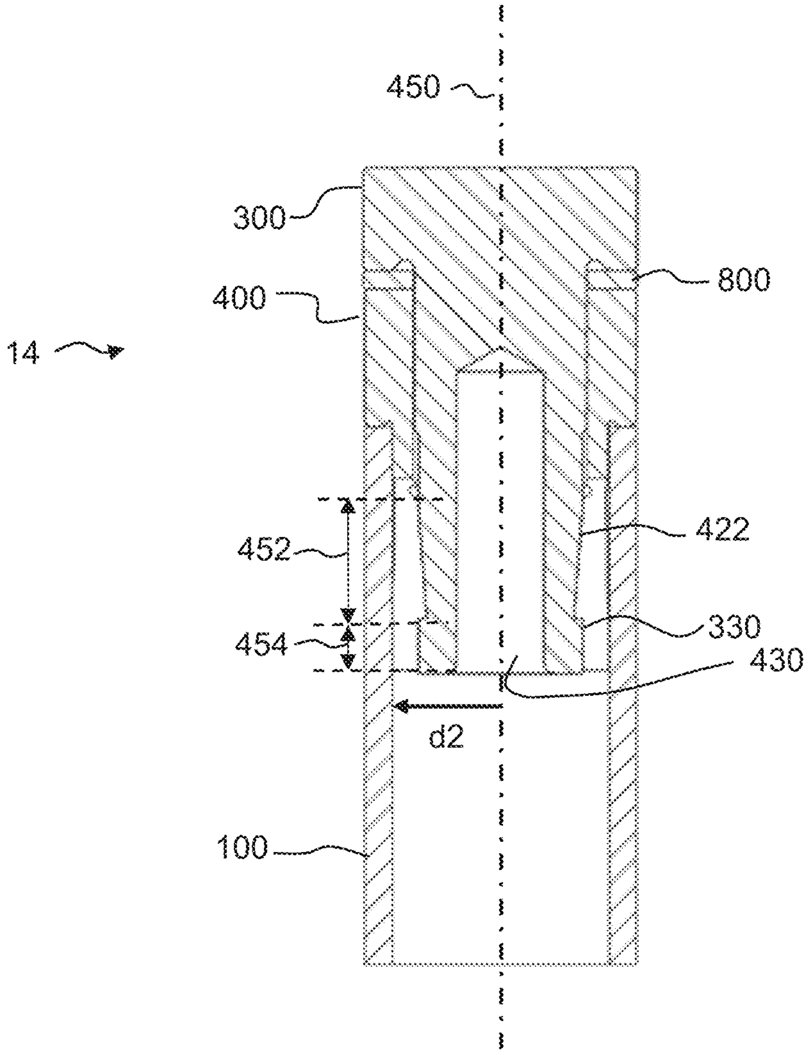

As illustrated in FIGS. 5, 13, 19, in the second configuration of the connector assembly 10, 12, 14 at least part of the engagement member 420 is forced away from the central axis 450 by the core element 300 such that the free end 440 of the engagement member is a second distance d2 from the central axis 450, the second distance d2 being greater than the first distance d1. That is to say, in the second configuration of the connector assembly 10, 12, 14 the free end 440 of the engagement member 420 is a second distance d2 from the central axis 450, the second distance d2 being greater than the first distance d1. The second distance d2 may be at least equal to the internal radius of the cavity 102 of the structural member 100.

In the second configuration of the connector assembly 10, 12, 14, the distance between the engagement member outer surface 422 and the central axis 450 may be substantially constant, since in the second configuration the engagement member outer surface 422 is pressed against the contact surface 104 of the structural member 100. In the second configuration of the connector assembly 10, 12, 14, the distance between the engagement member outer surface 422 and the central axis 450 may be greatest at the free end 440 and reduce in value along at least part of the engagement member outer surface 422.

Figure 9:
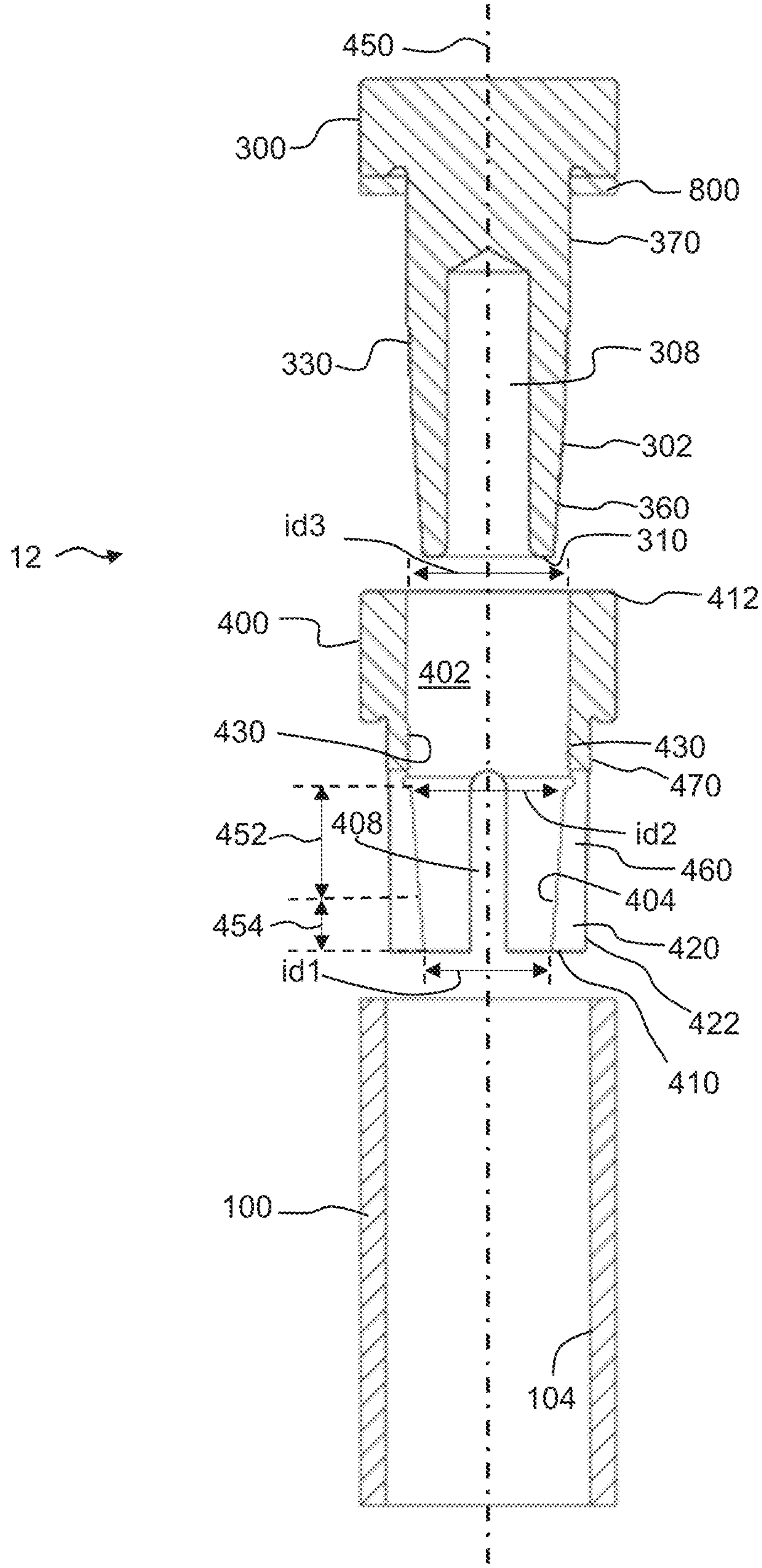
FIGS. 9 to 13 show stages of assembly of the connector assembly shown in FIG. 8.
Figure 10:
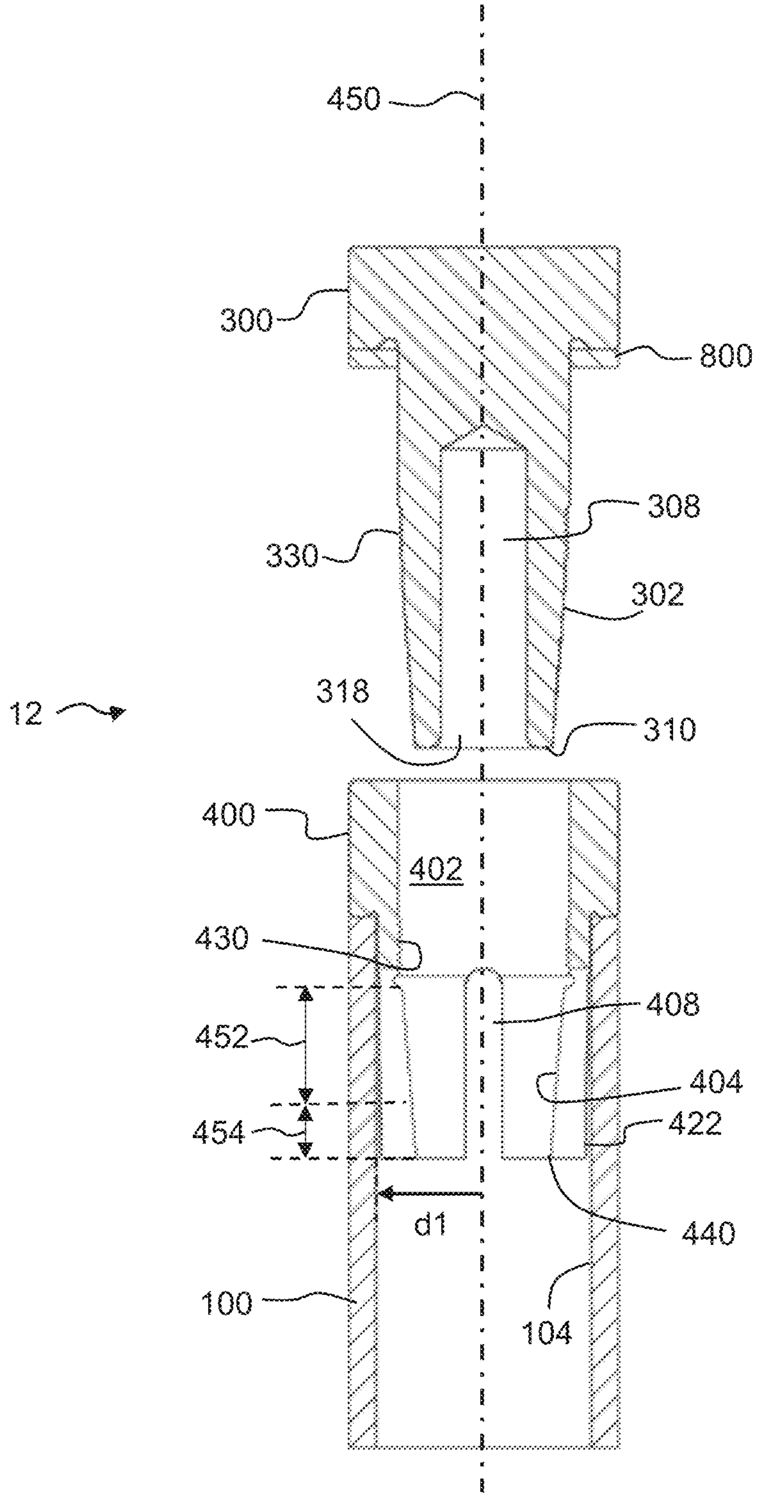
Figure 11:
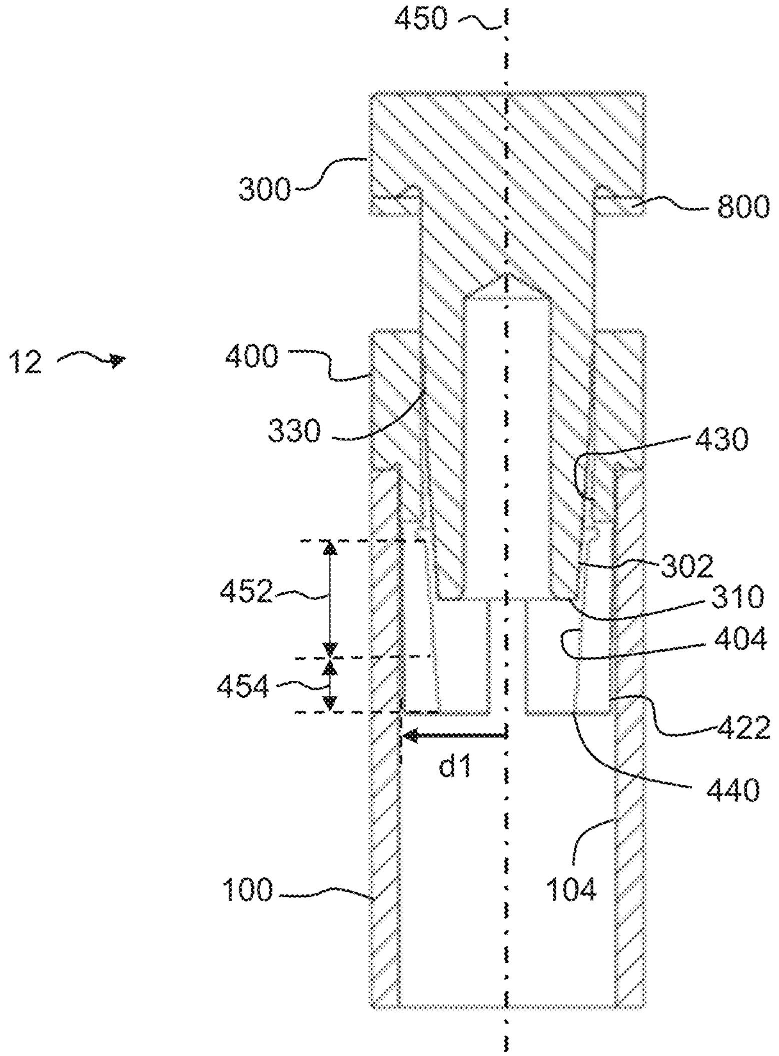
Figure 12:
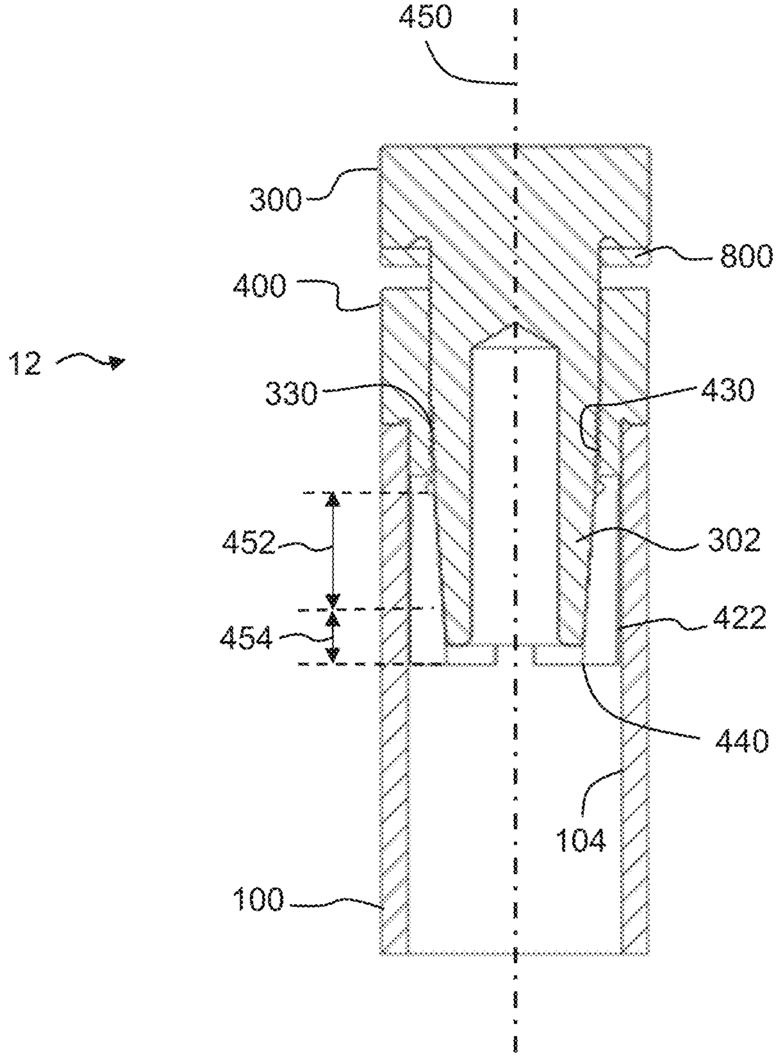

As illustrated in FIG. 9 (and applicable to the other examples) in the first configuration the engagement member inner surface 404 may increase in diameter from id1 to id2 from the leading edge end 410 along at least part of the engagement member inner surface 404 towards a region of constant diameter id3, and the region of constant diameter extends from the id2 diameter to the trailing edge 412.

Hence, when at least part of the core element 300 is entered and moved along the passage 402 of the sleeve member 400, and the core element 300 outer engagement surface 302 pushes against at least part of the engagement member inner surface 404, the frustoconical shape of the core element 300 outer engagement surface 302 and/or engagement member inner surface 404 result in an interaction such that the further that the core element 300 is pushed into the passage 402 towards the free end 440 of the engagement member 400, the free end 440 of the engagement member 400, and hence at least part of the engagement member outer surface 422, is urged away from the central axis 450. In this way, in practice, at least part of the engagement member outer surface 422 engages with the contact surface 104 of the structural member 100 as the core element 300 is pushed along the passage 402.

In each example of the connector assembly 10, 12, 14 of the present disclosure, the core element 300 may be provided with a first locking feature 330 and/or the engagement sleeve 400 may be provided with a second locking feature 430. The first locking feature 330 and second locking feature 430 may be configured to engage with one another to lock the engagement sleeve 400 and core element 300 together and may be configured to disengage from one another so the engagement sleeve 400 and core element 300 are separable (i.e. can move, for example slide, relative to one another so the assembly may be taken apart).

The first locking feature 330 and second locking feature 430 are positioned on the core element 300 and sleeve 400 respectively such that as the leading edge 310 of the core element 300 is pushed along the first region 452 of the passage 402 of the sleeve 400 in the direction from the trailing edge end 412 to the leading edge end 410, and before the first locking feature 330 engages with the second locking feature 430, the connector assembly 10, 12, 14 is in the first configuration.

The first locking feature 330 and second locking feature 430 are positioned on the core element 300 and sleeve 400 respectively such that as and/or just after the leading edge end 310 of the core element 300 engages with the second region 454 of the engagement sleeve 400, the first locking feature 330 engages with the second locking feature 430.

The transition from the connector assembly 10, 12, 14 from first configuration to the second configuration starts when the first locking feature 330 and second locking feature 430 engage. The second configuration is achieved by the act of locking first locking feature 330 with the second locking feature 430

In the examples shown in FIGS. 1 to 7 with respect to the first example connector assembly 10 and FIGS. 8 to 13 of the second example connector assembly 12, the first locking feature 330 is provided on an outer surface (e.g. radially outer surface) of the core element 300, between the section of the radially outer engagement surface 302 which engages with the radially inner surface 404 of the engagement member 420 and the trailing edge end 312 of the core element 300. The second locking feature 430 is provided on the inner surface (e.g. radially inner surface) of the engagement sleeve 400, between the radially inner engagement surface 404 of the engagement member 420 and the trailing edge end 412 of the engagement sleeve 400.

The first locking feature 330 on the core element 300 may be provided as a first screw thread. The second locking feature 430 on the engagement sleeve 400 may be provided as a second screw thread. The first screw thread and second screw thread are compatible with one another. The core element 300 and engagement sleeve 400 are rotatable relative to one another around the central axis 450 to engage and disengage the first locking feature 330 and second locking feature 430. The act of turning the core member 300 and sleeve member 400 relative to one another around the central axis 450 with the locking features 330, 430 engaged causes movement of the core member 300 along the passage 402 of the sleeve. The screw thread may be a four-start thread.

When the first locking feature 330 and second locking feature 430 are engaged, the core element 300 and sleeve member 400 are prevented from sliding relative to one another along the central axis 450.

Figure 20:
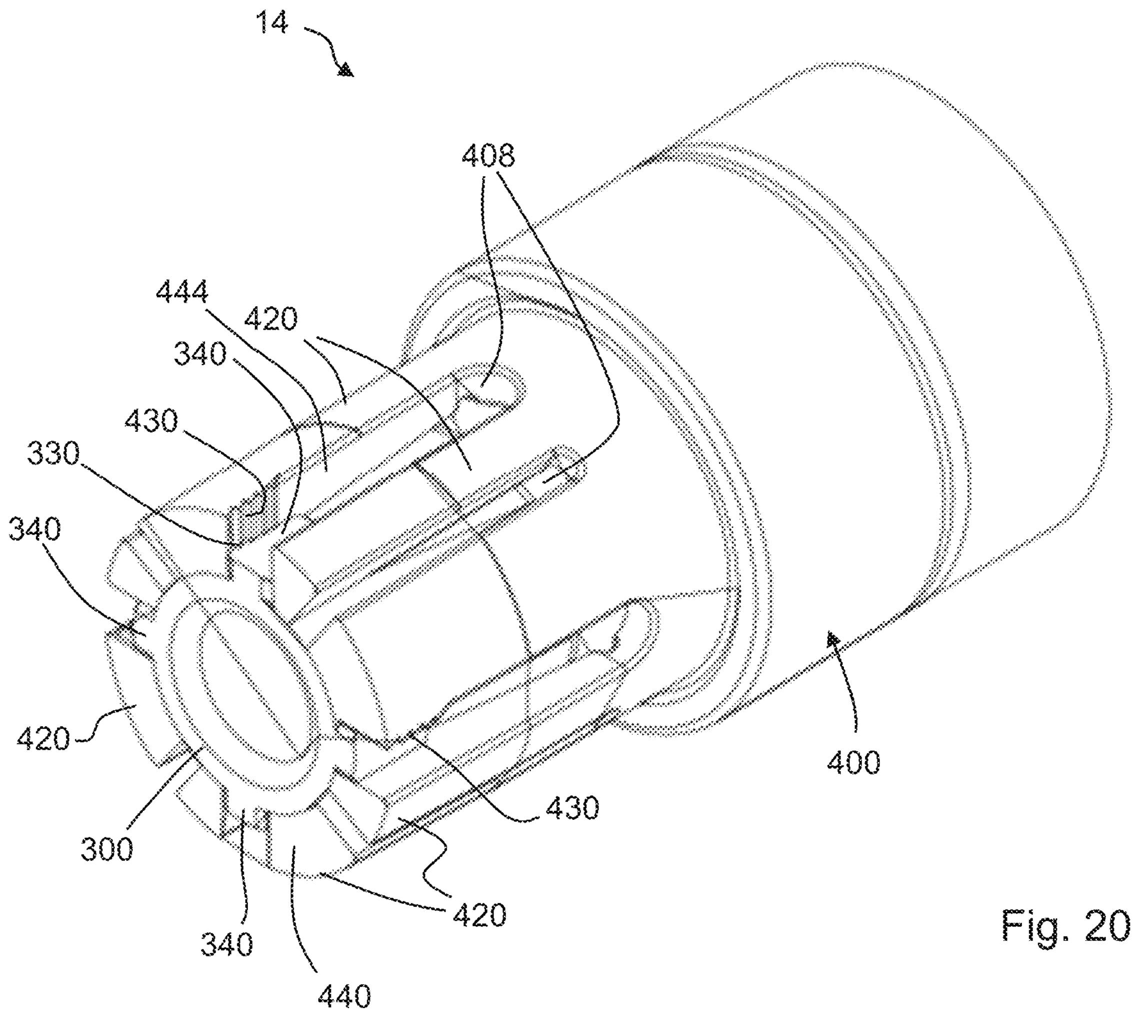
FIG. 20 is a perspective view of the connector assembly shown in FIGS. 14 to 19.
Figure 21:
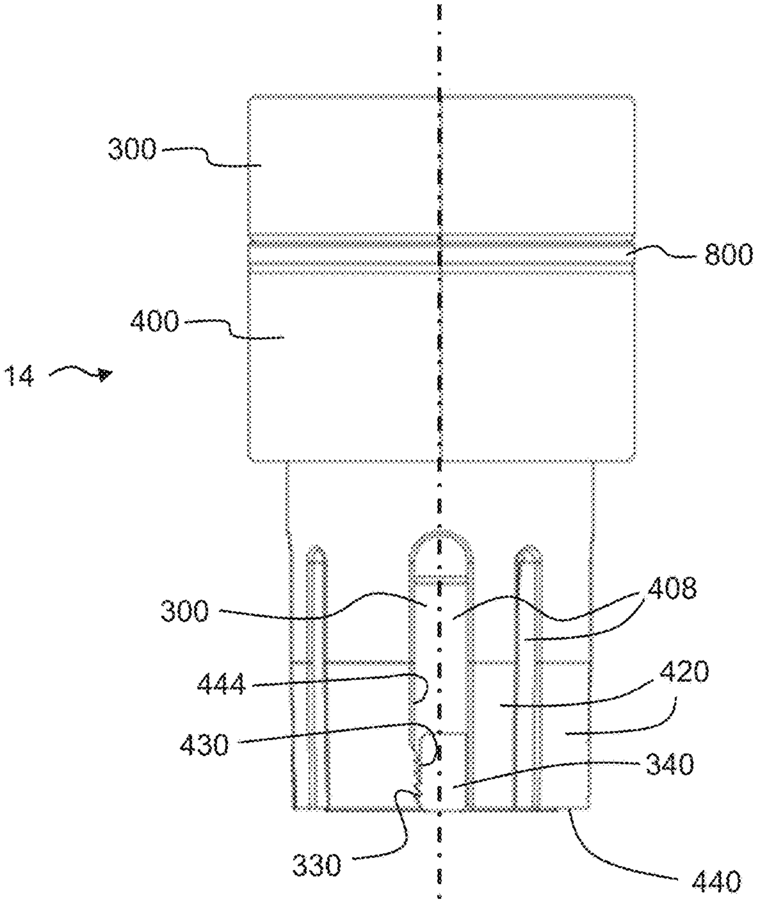
FIGS. 21 to 22 show stages of disassembly of the connector assembly shown in FIGS. 14 to 20.
Figure 22:
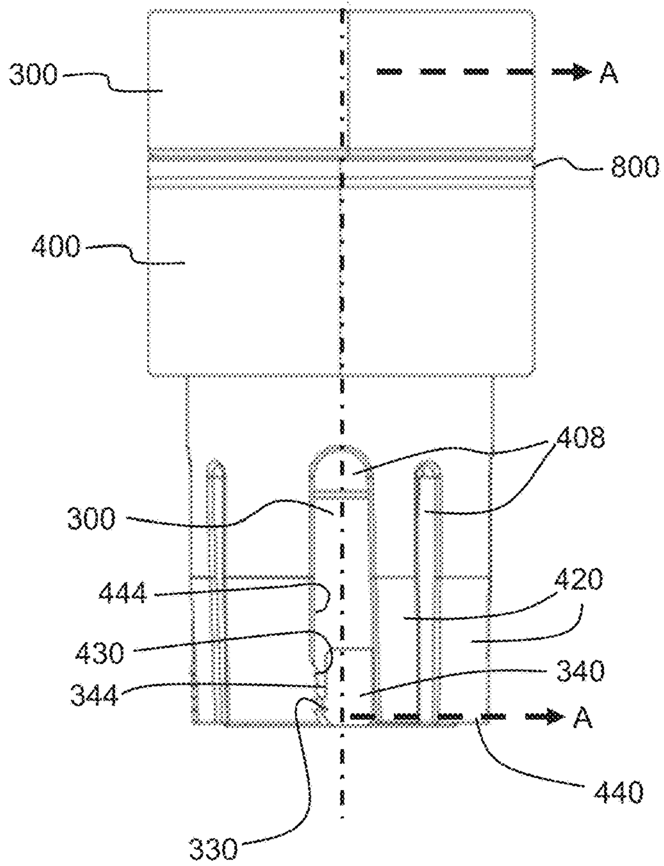

In the examples shown in FIGS. 14 to 22 with respect to the third example connector assembly 14, and as best shown in FIGS. 20 to 22, the first locking feature 330 is provided on the outer surface 302 (e.g. radially outer surface) of the core element 300 and comprises a mount 340 (e.g. an extension or pedestal) which extends outwards from (e.g. radially outward from), and extends along the outer engagement surface 302 from the core element 300 leading edge 310 part of the way towards the core element 300 trailing edge 312. A plurality of mounts 340 may be provided, spaced apart around the outer engagement surface 302 of the core element 300 leading edge 310.

In the example shown in FIGS. 14 to 22, in which a plurality of engagement members 420 are provided, spaced apart around the boundary/circumference of the sleeve 400, the or each mount 340 is sized to fit in the slot 408 defined between two adjacent engagement members 420. The outer diameter defined by the outer surface (e.g. radially outer surface) of the mounts 340 is no more than the diameter of the passage 402, so that the mounts 340 can pass through the passage 402 and then enter the slots 408 between the engagement members 420.

The mount 340 has a side surface 344 from which extend teeth 342 to extend in a first direction (e.g. a first circumferential direction). The second locking feature 430 is provided on a side 444 of the engagement sleeve 400 engagement member 420 and comprises teeth 442 which extend in a second direction (e.g. second circumferential direction) opposite to the first circumferential direction.

As best shown in FIGS. 20 to 22, the first direction and second direction are at right angles to the direction defined between the leading edge end 410 and trailing edge end 412 by the central axis 450. That is to say, in an example in which the core element 300 and sleeve member 400 are circular in cross-section, the first direction extends a first way (e.g. clockwise or anticlockwise) around the central axis 450, and the second direction extends a second way (e.g. anti-clockwise or clockwise) around the central axis 450, in an opposite direction to the first direction.

The teeth 342 of the first locking feature 330 and teeth 442 of the second locking feature 430 may be configured for interlocking engagement such that when the teeth 342 of the first locking feature 330 and teeth 442 of the second locking feature 430 are engaged, the core element 300 and engagement sleeve 400 are locked together.

As best shown in FIGS. 20 to 22, the teeth 342, 442 may be saw-tooth in nature, such that the gullet of the saw teeth 342 of the first locking feature 330 are sized to receive and locate the teeth 442 of the second locking feature 430 and such that the gullet of the saw teeth 442 of the second locking feature 430 are sized to receive and locate the teeth 342 of the first locking feature 330.

As shown in FIG. 21, the saw teeth 342, 442 may be orientated such that as the leading edge end 310 of the core element 300 translates towards and (optionally) beyond the leading edge end 410 of the engagement member 420 (i.e. in the first direction), the saw teeth 342 may slide over/past the saw teeth 442 (i.e. into and out of the gullet of the other set of teeth). However, the saw teeth 342, 442 may also be orientated such, after the teeth 342, 442 have engaged) that the if the leading edge end 310 of the core element 300 is urged to translate towards and trailing edge end 412 of the engagement member 420 (i.e. in the second direction), then the teeth 342, 442 lock together (i.e. because the teeth of one set of teeth 342, 442 are located in the gullets of the other set of teeth 342, 442) to prevent relative movement of the core element 300 and sleeve member 400.

As shown in FIG. 22, the core element 300 and engagement sleeve 400 may be disengaged by rotating the core element 300 and engagement sleeve 400 relative to one another (or rotating one of the core element 300 and engagement sleeve 400 relative to the other) such that the teeth 342 of the mount 340 can be lifted away from the teeth 442 of the engagement member 420. For example, as shown in FIG. 22, if the core element 300 is rotated around the central axis 450 in direction A, the mount 340 is moved away from the engagement member teeth 442.

As shown, the engagement sleeve 400 may comprise a plurality of engagement members (e.g. legs) 420 of the same configuration. The mounts 340 may be provided in only some of the slots 408 between the engagement members 420. Hence the mounts 340 may be provided in every second slot 408 between the engagement members 420 so that an engagement member 420 deflected by a mount 340 bends into the free space defined by a slot 408. That is to say, some of the engagement members 420 are configured to resiliently flex in a circumferential direction in response to a force being applied from the mounts 340.

Some of the engagement members 420 may be thinner than others. For example, the engagement members 420 on which teeth 442 are provided may be thicker than engagement members 420 which are configured to deflect when the mount 340 is pressed into them.

Thus the core element 300 and engagement sleeve 400 are rotatable relative to one another around the central axis 450 to disengage the first locking feature 330 and second locking feature 430.

As set out above, the connector assembly 10, 12, 14 according to the present disclosure may be provided with other components as a kit of parts. For example, as shown in the figures in relation to each of the examples, the kit of parts may comprise a first member 100 (e.g. a first structural member) which defines a cavity 102 with a contact surface 104, and an opening 106 to the cavity 102 to receive at least the leading edge end 410 of the engagement sleeve 400. The cavity 102 contact surface 104 for engagement with the sleeve engagement member 420 is of substantially constant cross-sectional area and/or constant diameter.

The kit of parts may further comprise a second member 200 (e.g. structural member and/or accessory). Hence when assembled the second member 200 may extend from and/or be coupled to the core element 300, such that the first member 100 is coupled to the second member 200 via the connector assembly 10, 12, 14.

The first member 100 and/or second member 200 may be provided as a hollow tube and/or pipe. The first member 100 and/or second member 200 may be provided as a hollow post or hollow rail.

The first member 100 and/or second member 200 define a cavity 102 with a contact surface 104, and an opening 106 to the cavity 102. In examples in which the first member 100 and second member 200 are hollow tubes/pipes, the opening 106 may be provided at an end of the tube/pipe. In examples in which the first member 100 and second member 200 are hollow tubes/pipes having a substantially constant diameter along their length and/or at least towards their opening end, with a wall having a constant thickness along their length and/or at least towards their opening end, the cavity 102 may be defined by the inner surface of the tube/pipe wall.

Hence, for example, if circular, the diameter (e.g. width) of the cavity contact surface 104 for engagement with the sleeve engagement member 420 may be at most the same as the outer diameter of the sleeve engagement member outer surface 422.

The connector assembly and/or kit of parts according to the present disclosure may form at least a. a fencing assembly
b. a machine guarding assembly
c. a hand rail assembly
d. a balustrade assembly
e. a decking assembly
f. a climbing frame assembly
g. a playground assembly
h. a temporary support structure assembly
i. a scaffold assembly
j. a barrier assembly;
k. a post assembly; or
l. a support structure for temporary cover systems e.g. a pagodas, gazebos, tent.

Figure 25:
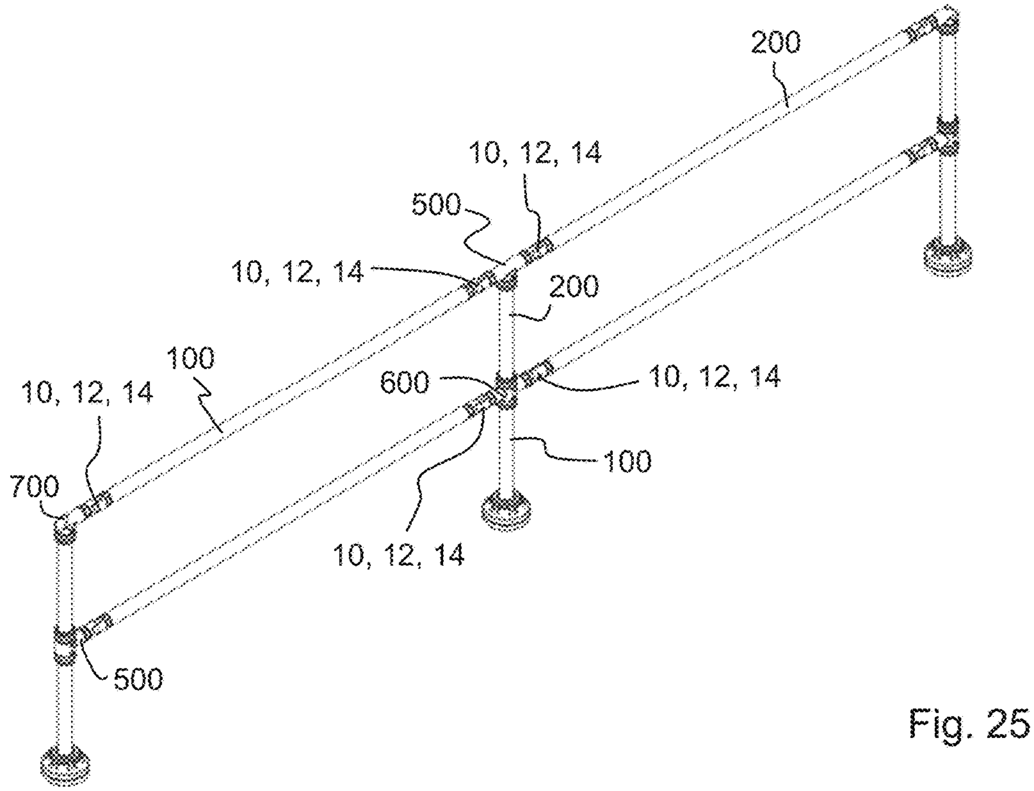
FIG. 25 shows an assembly using a connector assembly according to the present disclosure.

FIG. 25 shows an example structure constructed using a kit of parts according to the present disclosure. Any of the example of connector assemblies 10, 12, 14 according to the present disclosure may be combined with T joints 500, cross joints 600 and/or L joints 700 to assemble a structure from structural members 100, 200. For example a connector assembly 10, 12, 14 may join a first structural member (e.g. a tube) 100 to a T joint, the T joint links to further connector assemblies which link to further structural members 100, 200, and/or the T joint links directly to further structural members 100, 200.

The second member 200 may be an end cap or mount for an accessory. The engagement sleeve 400 may provide fluid communication between the first member 100 cavity 102 to an external surface of the cap or mount (for example, when assembled, to provide a vent from the inside of the structural member to the space around the assembly).

A resilient washer or seal 800 may be provided between the core element 300 and trailing edge end 412 of the sleeve 400. This may be provided as a resilient member to ensure the core element 300 can tighten down onto the sleeve 400 and to ensure there is a force on the locking features between the core element 300 and sleeve 400 to keep the locking features engaged.

In operation, an engagement sleeve 400 may be first entered in the cavity 102 (e.g. end of pipe, tube that forms a structural member 100, 200). The engagement member(s) 420 slide into the cavity 102, along the contact surface 104. The core element 300 is then entered in the opening 406 of the sleeve 400 to pass along the passage 402. As described above, as the core element 300 travels along the passage 402 and engages with the engagement member 420, the inner surface 404 of the engagement member 420 is deflected outwards and the engagement member outer surface 422 engages with the contact surface 104 of the structural member 100 to fix them together.

The core element 300 may be locked to the engagement sleeve 400 by the locking means 330, 430 to thereby prevent the core element 300 sliding out of the engagement sleeve 400, and thereby ensuring the core element 300 remains locked to the engagement sleeve 400.

When required, the core element 300 may be unlocked from the engagement sleeve 400, and removed from the sleeve 400 by reversing the assembly process. With the core element 300 removed, the engagement member(s) 420 are free to deflect inwardly and hence remove the engagement between the engagement members 420 and the structural member contact surface 104.

Hence there is provided a connector assembly and a kit of parts for a structure which provides significant advantages over examples of the prior art.

The connector assembly comprises only two parts which may be fitted to the structural members in series (i.e. one at a time). This means a single user can easily make the connection, and thus building a structure using the connector assembly of the present disclosure can be done with fewer people.

Since only two parts are required, the sleeve 400 and core element 300, less manufacturing processes and materials are required to make the parts of the assembly, thereby simplifying manufacturing and shipping.

Since the connection mechanism between the core element 300 and sleeve 400 also results in the engagement of the sleeve to the structural member, a user performs fewer steps to achieve the build. Having only two parts to work with also means that a user is less likely to make any errors during the build.

Since fixing elements (for example screws and bolts) are not required, there is less chance of the parts becoming damaged (for example by cross threading) during build.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A connector assembly for engagement with a first member, wherein the first member defines a cavity with a contact surface, and an opening to the cavity; the connector assembly comprising:

a core element having an outer engagement surface extending from a leading edge end towards a trailing edge end; and an engagement sleeve extending from a leading edge end to a trailing edge end, the engagement sleeve defining a passage having a central axis and an opening at the trailing edge end, wherein the engagement sleeve opening and engagement sleeve passage are configured to receive at least part of the core element extending from the leading edge end of the core element, wherein the engagement sleeve includes at least one engagement member having an outer surface and an inner surface, wherein the outer surface of the at least one engagement member is configured for engagement with the contact surface of the first member, wherein the inner surface of the at least one engagement member has a first region and a second region, the second region extends from a free end defined by the leading edge end to an end of the first region, and the first region extends towards the opening of the engagement sleeve passage, wherein the inner surface of the at least one engagement member and the outer engagement surface of the core element are configured to be slidable relative to each other in the first region and the second region, wherein the core element and the engagement sleeve are configured such that, with the engagement sleeve entered in the cavity of the first member, the connector assembly is operable to be in a first configuration in which the engagement sleeve is slidable relative to the contact surface of the cavity of the first member when the leading edge end of the core element is located along the first region of the at least one engagement member, and the connector assembly is operable to be in a second configuration in which the engagement sleeve is locked relative to the first member when the leading edge end of the core element is engaged with the second region of the at least one engagement member, wherein the core element is provided with a first locking feature, and the engagement sleeve is provided with a second locking feature, wherein the first locking feature and the second locking feature are configured to engage with one another to lock the engagement sleeve and the core element together and are configured to disengage from one another, so the engagement sleeve and the core element are separable, wherein the first locking feature is provided on the outer engagement surface of the core element, the first locking feature including a mount, which extends outwards from and extends along the outer engagement surface from the leading edge of the core element toward the trailing edge end of the core element, and further including teeth provided on a side of the mount to extend in a first circumferential direction, wherein the second locking feature is provided on a side of the at least one engagement member and includes teeth, which extend in a second circumferential direction opposite to the first circumferential direction, and wherein the teeth of the first locking feature and the teeth of the second locking feature are configured for interlocking engagement such that, when the teeth of the first locking feature and the teeth of the second locking feature are engaged, the core element and the engagement sleeve are locked together.

2. The connector assembly as claimed in claim 1, wherein the core element and engagement sleeve are configured such that, when the leading edge end of the core element slides along at least part of the second region of the inner surface of the at least one engagement member, the outer surface of the at least one engagement member is urged to engage with the contact surface of the cavity of the first member until the connector assembly is in the second configuration.

3. The connector assembly as claimed in claim 1, wherein:

when the leading edge end of the core element is located along the first region of the inner surface of the at least one engagement member, a clearance fit is maintained between the inner surface of the engagement sleeve and the outer engagement surface of the core element; and when the leading edge end of the core element is engaged with the second region of the inner surface of the at least one engagement member, there is an interference fit between the inner surface of the engagement sleeve and the outer engagement surface of the core element.

4. The connector assembly as claimed in claim 1, wherein the core element and engagement sleeve are configured such that, as the leading edge end of the core element moves from being engaged with the second region of the at least one engagement member to being located along the first region of the at least one engagement member, the outer engagement surface of the core element disengages with the inner surface of the engagement sleeve so as to permit the at least one engagement member to disengage with the contact surface of the cavity of the first member, and such that the connector assembly transitions from the second configuration to the first configuration to thereby allow the engagement sleeve to slide along the contact surface of the cavity of the first member.

5. The connector assembly as claimed in claim 1, wherein:

in the first configuration, the free end of the at least one engagement member is a first distance from the central axis; and in the second configuration, the free end of the at least one engagement member is a second distance from the central axis, the second distance being greater than the first distance.

6. The connector assembly as claimed in claim 1, wherein:

in the first configuration, the outer surface of the at least one engagement member increases in diameter from the leading edge end from a first diameter to a second diameter and then extends towards the trailing edge end with a region of constant diameter.

7. The connector assembly as claimed in claim 1, wherein:

in the first configuration, the inner surface of the at least one engagement member increases in diameter from the leading edge end along at least part of the inner surface of the at least one engagement member toward the trailing edge end.

8. The connector assembly as claimed in claim 1, wherein:

the core element outer engagement surface increases in diameter from the leading edge end towards the trailing edge end terminating in a region of constant diameter.

9. The connector assembly as claimed in claim 1, wherein:

the first locking feature and the second locking feature are positioned such that before the first locking feature engages with the second locking feature, the leading edge end of the core element is in the first region of the at least one engagement member and the connector assembly is in the first configuration, and after the first locking feature engages with the second locking feature, the leading edge end of the core element is in the second region of the at least one engagement member.

10. The connector assembly as claimed in claim 1, wherein the outer surface of the at least one engagement member is smooth or provided with at least one engagement tooth.

11. The connector assembly as claimed in claim 1, wherein the core element defines an opening at the trailing edge end configured for receiving and engaging with a second member.

12. The connector assembly as claimed in claim 1, wherein:

the at least one engagement member comprises a plurality of engagement members spaced apart around the central axis; and each engagement member of the plurality of engagement members has an outer surface for engagement with the contact surface of the cavity, an inner surface for engagement with the outer engagement surface of the core element, and a free end at the leading edge end of the engagement sleeve, such that the free ends are spaced apart from one another around the central axis with a slot therebetween.

13. A kit of parts for a structure, the kit of parts comprising:

a connector assembly as claimed in claim 1; and a first member which defines a cavity with a contact surface, and an opening to the cavity to receive at least the leading edge end of the engagement sleeve.

* * * * *